(12) United States Patent
Sekoguchi et al.

(10) Patent No.: US 7,961,451 B2
(45) Date of Patent: *Jun. 14, 2011

(54) ION GENERATING ELEMENT, AND ION GENERATING APPARATUS EQUIPPED WITH SAME

(75) Inventors: Yoshinori Sekoguchi, Nara (JP); Ichiro Tokai, Yao (JP); Hiromu Nishida, Yamatokoriyama (JP); Satoshi Takahashi, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/557,299

(22) Filed: Sep. 10, 2009

(65) Prior Publication Data

US 2010/0020462 A1 Jan. 28, 2010

Related U.S. Application Data

(62) Division of application No. 10/555,406, filed as application No. PCT/JP2004/006588 on May 10, 2004, now Pat. No. 7,639,472.

(30) Foreign Application Priority Data

May 15, 2003 (JP) ................................. 2003-137098
Mar. 16, 2004 (JP) ................................. 2004-074600

(51) Int. Cl.
*H01T 23/00* (2006.01)
(52) U.S. Cl. ...................................... 361/230
(58) Field of Classification Search .................. 361/230, 361/231
See application file for complete search history.

(56) References Cited

U.S. PATENT DOCUMENTS

| 3,072,978 | A | * | 1/1963 | Minto ............................. 96/224 |
| 4,901,194 | A | | 2/1990 | Steinman et al. |
| 5,055,963 | A | | 10/1991 | Partridge |
| 6,259,591 | B1 | | 7/2001 | Pitel et al. |
| 6,850,403 | B1 | * | 2/2005 | Gefter et al. .................. 361/230 |
| 7,161,789 | B2 | * | 1/2007 | Robertson ..................... 361/230 |
| 2002/0051333 | A1 | | 5/2002 | Richie, Jr. et al. |

FOREIGN PATENT DOCUMENTS

| EP | 0 178 907 | | 4/1986 |
| EP | 0 386 318 | | 9/1990 |
| JP | 3-230499 | A | 10/1991 |
| JP | 4-90428 | A | 3/1992 |
| JP | H06-068397 | U | 9/1994 |
| JP | 08-171977 | A | 7/1996 |
| JP | 8-217412 | A | 8/1996 |
| JP | H08-298196 | A | 11/1996 |
| JP | 9-610 | A | 1/1997 |
| JP | 09-320791 | A | 12/1997 |

(Continued)

*Primary Examiner* — Ronald W Leja
(74) *Attorney, Agent, or Firm* — Birch, Stewart, Kolasch & Birch, LLP

(57) ABSTRACT

An ion generating element includes a positive ion discharger for generating positive ions and a negative ion discharger for generating negative ions. The ion dischargers are arranged separately from and independently of each other with a distance securing insulation between them. At least one of the dischargers includes a discharging portion for causing electric discharge, and a conducting portion having a voltage same as the discharging portion. The conducting portion surrounds a perimeter or part of the discharging portion. The conducting portion may surround a perimeter or part of the discharging portion so as to partition the ion dischargers from each other.

8 Claims, 18 Drawing Sheets

FOREIGN PATENT DOCUMENTS

| | | | |
|---|---|---|---|
| JP | 2000-311797 A | | 7/2000 |
| JP | 2002-95731 A | * | 4/2002 |
| JP | 2002-216933 A | | 8/2002 |
| JP | 2002-319472 A | | 10/2002 |
| JP | 2003-47651 A | | 2/2003 |
| JP | 2003-100420 A | | 4/2003 |
| WO | WO 02/053993 A1 | | 7/2002 |
| WO | WO 03/013620 A1 | | 2/2003 |
| WO | WO 03/028179 A1 | | 4/2006 |

* cited by examiner

FIG.1A
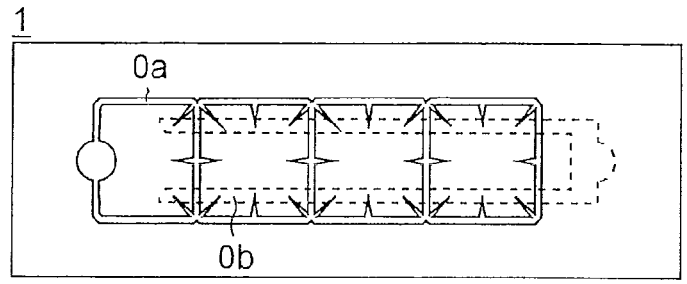
FIG.1B
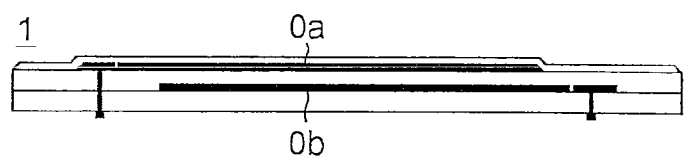
FIG.1C
FIG.1D
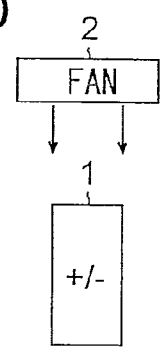
FIG.1H
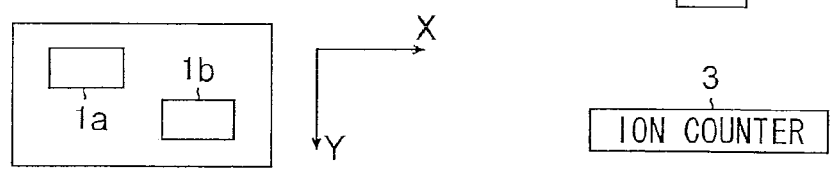
FIG.1E  FIG.1F  FIG.1G
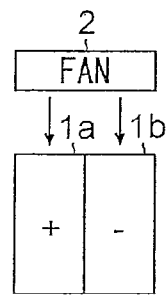 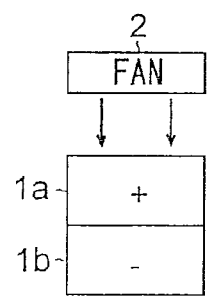 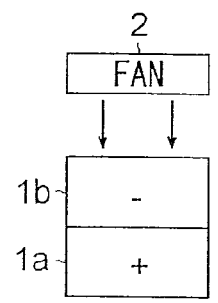

FIG.7

| DISCHARGE ELECTRODE INTERVAL d [mm] | ION CONCENTRATION [ions/cc] | | SPARK OCCURRENCE |
|---|---|---|---|
| 1 | POSITIVE ONLY | --- | SPARKS OCCURREE |
| | NEGATIVE ONLY | --- | |
| | SIMULTANEOUS [+/−] | --- | |
| 3 | POSITIVE ONLY | --- | SPARKS OCCURRED FOR FIRST SEVERAL MINUTES |
| | NEGATIVE ONLY | --- | |
| | SIMULTANEOUS [+/−] | --- | |
| 5 | POSITIVE ONLY | 200,000 | NO SPARKS |
| | NEGATIVE ONLY | 260,000 | |
| | SIMULTANEOUS [+/−] | 380,000 / 160,000 | |
| 8 | POSITIVE ONLY | 700,000 | NO SPARKS |
| | NEGATIVE ONLY | 550,000 | |
| | SIMULTANEOUS [+/−] | 700,000 / 550,000 | |

ION GENERATING ELEMENT, AND ION GENERATING APPARATUS EQUIPPED WITH SAME

This application is a Divisional of U.S. patent application Ser. No. 10/555,406 filed on Jan. 4, 2007, now U.S. Pat. No. 7,639,472 which is a National Phase of PCT Application No. PCT/JP2004/006588 filed on May 10, 2004, which claims priority under 35 U.S.C. §119(a) to Patent Application No. JP-2003-137098 filed in Japan on May 15, 2003, and to Patent Application No. JP-2004-74600 filed in Japan on Mar. 16, 2004, the entire contents of each of the above-identified applications are hereby incorporated by reference.

TECHNICAL FIELD

The present invention relates to an ion generating element and an ion generating apparatus that, by releasing positive and negative ions into a space, can decompose bacteria, mold spores, toxic substances, and the like floating in the air. The present invention also relates to an electric appliance incorporating such an ion generating element or apparatus. Examples of such electric appliances include air conditioners, dehumidifiers, humidifiers, air purifiers, refrigerators, fan heaters, microwave ovens, washer-driers, cleaners, and sterilizers that are used chiefly in a closed space (i.e., in a house, in a room in a building, in a sickroom or operating room in a hospital, in a car, in an aircraft, in a ship, in a storehouse, or in a compartment in a refrigerator).

BACKGROUND ART

In general, in an air-tight, ill-ventilated room such as an office room or meeting room, the presence of a large number of people in it increases the amounts of air pollutants such as carbon dioxide—which the people breathe out—, cigarette smoke, and dust. This reduces the quantity of negative ions—which have the effect of relaxing humans—present in the air. In particular, the presence of cigarette smoke may reduce the quantity of negative ions to about ½ to ⅕ of their normal quantity. To cope with this, various ion generating apparatuses that are designed to replenish the air with negative ions have conventionally been commercially available.

However, conventional ion generating apparatuses exploiting electric discharge are typically of the type that generates negative ions by the use of a high negative direct-current voltage, and are aimed at appealing to consumers with a relaxing effect. Accordingly, such ion generating apparatuses can simply replenish the air with negative ions, but cannot actively remove airborne bacteria and the like floating in the air.

Here are the results of our searching the past patent publications for examples of other types of ion generating apparatuses.

Japanese Patent Application Laid-Open No. H4-90428 (hereinafter referred to as Patent Publication 1) describes an ion generator wherein a high alternating-current voltage is applied to a discharge wire or a discharge plate having an acute-angled corner to generate negative ions alone or both negative and positive ions. This publication, however, only makes mention of a high alternating-current voltage unit as to the method or means of generating ions. Here, the assumed area of application is air conditioners, and the asserted effects are comfort and relaxation to humans.

Japanese Patent Application Laid-Open No. H8-217412 (hereinafter referred to as Patent Publication 2) describes a corona discharger that has a pair of electrodes, namely a discharge electrode and an induction electrode, arranged so as to sandwich an insulating member and that is provided with a high-voltage power supply for feeding a high alternating-current voltage between those electrodes. This publication describes the high-voltage power supply as having a diode connected between the electrodes so that, according to the direction in which the diode points, either a negative potential or a positive potential is chosen as the supplied voltage. However, this publication makes no mention of how such switching is achieved. Here, the assumed area of application is corona discharge equipment such as ozone generating apparatuses, charging apparatuses, and ion generating apparatuses. The asserted effect is generation of ions.

Japanese Patent Application Laid-Open No. H3-230499 (hereinafter referred to as Patent Publication 3) describes an ion generating apparatus wherein a large number of pairs of electrodes—each pair consisting of a needle-shaped discharge electrode and an conductive grounding grid or ring—arranged two-dimensionally across the stream of purified air, and wherein a negatively biased high sinusoidal alternating-current voltage is applied to some of the discharge electrodes and a positively biased high sinusoidal alternating-current voltage is applied to some other of the discharge electrodes so that, of the plurality of pairs of electrodes, some release positive ions and some other release negative ions. This ion generating apparatus includes a means for controlling the bias voltage, and this permits adjustment of the quantities of positive and negative ions. The assumed area of application is charge neutralizing equipment for clean rooms, and the asserted effect is neutralization of electric charges.

Japanese Patent Application Laid-Open No. H9-610 (hereinafter referred to as Patent Publication 4) describes a dust collecting apparatus wherein the voltages applied to electrodes at which to cause positive and negative electric discharge are variable. The electrodes are an ionizing wire and a dust collecting plate, which are designed to charge dust and thereby collect it in on the dust collecting plate. The assumed area of application is electric dust collecting apparatuses for air conditioning equipment, and the asserted effect is sterilization of the interior of such apparatuses by the action of the ozone generated by electric discharge.

Ion generating electrodes exploiting electric discharge divide roughly into two types. One type is, as described in Patent Publications 1, 3, and 4, a metal wire, a metal plate having an acute-angled corner, or a needle combined with, as an opposite electrode, the earth or a metal plate or a grid kept at the grounded potential, with air serving as an insulating member. The other type is, as described in Patent Publication 2, Japanese Patent Application Laid-Open No. 2003-47651 (hereinafter referred to as Patent Publication 5), and Japanese Patent Application Laid-Open No. 2002-319472 (hereinafter referred to as Patent Publication 6)—of which the latter two will be described later—, a combination of a discharge electrode and an induction electrode formed with a solid dielectric member sandwiched in between. The former is characterized in that the use of air as an insulating member permits the electrodes to be kept farther away from each other than in the latter and thus requires a higher voltage to cause electric discharge. By contrast, the latter is characterized in that the use of an insulating member having a high insulation resistance and a high dielectric constant permits the distance between the electrodes to be made smaller (narrower) and thus requires a lower application voltage than in the former.

There have conventionally been made inventions relating to ion generating apparatuses (for example, see Patent Publications 5 and 6) that exploit the effects produced by releasing ions of opposite polarities, i.e., positive and negative ions.

These ion generating apparatuses generate and release into the air approximately equal quantities of $H^+(H_2O)_m$ as positive ions and $O_2^-(H_2O)_n$ as negative ions (where m and n are natural numbers) so that those ions surround airborne mold spores and viruses floating in the air and deactivate them by the action of a free radical, namely hydroxyl radical (.OH), generated as a result.

These inventions have already been put into practical use by the applicant of the present application. The actual products are ion generating apparatuses composed of a ceramic dielectric member, a discharge electrode arranged outside the dielectric member, and an induction electrode arranged inside the dielectric member, and air purifiers and air conditioners incorporating such ion generating apparatuses.

Negative ions are believed to produce the following effects. In a space in a household where an excessive quantity of positive ions are present due to electric appliances or for other causes, releasing a large quantity of negative ions helps to restore a state in which well-balanced quantities of positive and negative ions are present as in a wild forest, and to obtain a relaxing effect. Patent Publication 1 makes mention of such a relaxation effect.

DISCLOSURE OF THE INVENTION

An object of the present invention is to generate positive and negative ions for the purpose of deactivating mold spores and viruses floating in the air, and to achieve that more effectively. In general, ion generating apparatuses exploiting electric discharge generate ozone at the same time that they generate ions. Patent Publication 4 describes how the oxidizing ability of ozone is used to achieve sterilization inside apparatuses. It is generally known that a high concentration of ozone is hazardous to the human body. Thus, for the applicant of the present application, it is a highly difficult object to maximize the quantity of ions while minimizing the amount of ozone generated.

The applicant of the present application has applied for patents for ion generating apparatuses as described in Patent Publications 5 and 6 etc. in the field of small-size ion generating apparatuses that can be incorporated not in equipment as targeted by Patent Publication 3 but in electric appliances for household use. By the use of those ion generating apparatuses, it is possible to generate approximately equal quantities of positive and negative ions.

To alleviate the neutralization of simultaneously generated positive and negative ions among themselves, it is common to spread the ions into a space by carrying them on a wind stream. However, where positive and negative ions are generated simultaneously, it is inevitable that part of the ions of opposite polarities neutralize and vanish as soon as they are generated. In the ion generating apparatus described in Patent Publication 3, a large number of electrodes are arranged two-dimensionally across the stream of purified air. That is, the wind stream flows in the direction in which needle extend. For compactness, safety, and energy saving, the applicant of the present application gives priority to reducing the applied voltage, and thus adopts a structure in which a pair of electrodes is formed by a discharge electrode formed on the surface of a dielectric member and an induction electrode buried in the dielectric member. In this case, a wind stream flowing in the direction described in Patent Publication 3 mentioned above is not suitable to spread ions, and therefore a wind stream is blown parallel to the surface of the dielectric member. When a developed ion generator is incorporated in various products, it is effective to limit the direction of the wind stream blown to the ion generator to the ideal direction, but there may be cases where such limitation is impossible.

An object of the present invention is to provide an ion generating element and an ion generating apparatus that are so designed as to alleviate the neutralization among the generated ions themselves to achieve effective releasing of ions and that thus operate with enhanced ion generation efficiency. Another object of the present invention is provide an electric appliance incorporating such an ion generating element or apparatus.

To achieve the above object irrespective of whether a wind stream is blown from the X- or Y-axis direction with respect to a base member, according to the present invention, in an ion generating element provided with at least one first discharger for generating positive ions and at least one second discharger for generating negative ions, both fitted or printed on a single base member, the first and second dischargers are arranged both on the same flat surface of the base member but separately from and independently of each other on a diagonal line of the flat surface (i.e., obliquely). Here, the electrodes may be needle-shaped electrodes, but, basically, the applicant of the present application assumes the use of a pair of electrodes consisting of a discharge electrode formed on the surface of a dielectric member and an induction electrode buried in the dielectric member. Here, to prevent the ions generated at the windward-side discharger from being neutralized at the leeward-side discharger of the opposite polarity irrespective of whether the wind stream is blown from the X- or Y-axis direction with respect to the surface of the discharge electrode on the dielectric member, the first and second dischargers are arranged on a diagonal line, i.e., obliquely, with respect to the direction of the wind stream (in the X- or Y-axis direction).

In a case where there are restrictions on the area on the base member on which the first and second dischargers can be fitted or printed, securing an insulating distance between the first and second dischargers may make it difficult to arrange them on a diagonal line (i.e., obliquely) as described above. In that case, a first conducting portion is arranged so as to surround the perimeter or a part of a first discharging portion—which generates positive ions—and is kept at an equal potential with the first discharging portion. The second discharger—which generates negative ions—is structured in a similar manner. The first and second conducting portions are arranged on the same flat surface but separately from and independently of each other in such a way that they face each other. The positive ions released from the first discharging portion, before they are neutralized by the opposite potential at the second discharging portion, are repelled by the first conducting portion—surrounding the first discharging portion and kept at an equal potential therewith—and are released together with the wind stream. The same is true with the second discharging portion. Here, as described above, the electrodes may be needle-shaped electrodes, but, basically, they are assumed to be a pair of electrodes consisting of a discharge electrode formed on the surface of a dielectric member and an induction electrode buried in the dielectric member.

According to the present invention, in an ion generating element provided with at least one first discharger for generating positive ions and at least one second discharger for generating negative ions, both fitted or printed on a single base member, the first and second dischargers are each composed of a pair of a first or second discharging electrode, respectively, formed on the surface of a dielectric member serving as the base member and a first or second induction electrode, respectively, buried in the dielectric member, and are arranged both on the same flat surface of the base member but separately from and independently of each other. This construction can alleviate the neutralization of the generated ions among themselves as compared with one in which positive and negative ions are generated alternately at predetermined time intervals by the use of a single ion generating element.

By arranging the first and second dischargers in such a way that the first and second discharge electrodes are located at a predetermined distance from each other, it is possible to prevent occurrence of sparks (spark discharge) between the first and second discharge electrodes and thereby enhance reliability. It is also possible to further alleviate the neutralization among the generated ions themselves.

In a construction in which a pair of electrodes is used that consists of a discharge electrode formed on the surface of a dielectric member and an induction electrode buried in the dielectric member, from the perspective of reducing the generation of ozone, the waveform of the voltage applied to the first and second dischargers is not a common sinusoidal alternating-current waveform as disclosed in Patent Publications 2 and 3. Instead, in an ion generating element according to the invention, an alternating-current impulse voltage is applied. This helps to generate ions stably and to keep ozone low. A voltage waveform obtained by positively biasing an alternating-current impulse voltage is applied to the first discharger to generate positive ions, and a voltage waveform obtained by negatively biasing the same alternating-current impulse voltage is applied to the second discharger to generate negative ions.

The voltage application circuit is provided with a first voltage application portion and a switching portion whose operation can be switched between a mode in which they generate positive ions by applying to the first discharger of the ion generating element a voltage waveform obtained by positively biasing an alternating-current impulse voltage and a mode in which they generate negative ions by applying to the first discharger of the ion generating element a voltage waveform obtained by negatively biasing the same alternating-current impulse voltage, and a second voltage application portion that generates negative ions by applying to the second discharger of the ion generating element a voltage waveform obtained by negatively biasing the same alternating-current impulse voltage. This makes it possible to switch the operation between a mode in which both positive and negative ions are generated and a mode in which only negative ions are generated. Thus, it is possible to switch the polarity of the generated ions automatically or manually according to the environment, situation, or purpose in or for which the ion generating apparatus is used. When both positive and negative ions are generated, the purpose is to deactivate mold spores and viruses floating in the air. When only negative ions are generated, the purpose is to bring a state in which an excessive quantity of positive ions are present due to electric appliances or for other causes in a household back to a state in which well-balanced quantities of positive and negative ions are present, or to obtain a relaxing effect. Such switching is possible by the use of a single electrode and a single ion generating apparatus.

To realize the above-described switching at low cost and with a small number of components, the voltage application circuit is provided with a third voltage application portion and a bias switching portion whose operation can be switched between a mode in which they generate positive ions by applying to the first discharger of the ion generating element a voltage waveform obtained by positively biasing an alternating-current impulse voltage and a mode in which they generate positive and negative ions by applying to the first discharger of the ion generating element a non-biased alternating voltage waveform of the same alternating-current impulse voltage, and a second voltage application portion that generates negative ions by applying to the second discharger of the ion generating element a voltage waveform obtained by negatively biasing the same alternating-current impulse voltage. This makes it possible to switch operation between a mode in which approximately equal quantities of positive and negative ions are generated and a mode in which a large quantity of negative ions relative to the quantity of positive ions are generated. Thus, it is possible to switch the polarity of the generated ions automatically or manually according to the environment, situation, or purpose in or for which the ion generating apparatus is used. When approximately equal quantities of ions are generated, the purpose is to deactivate mold spores and viruses floating in the air. When a larger quantity of negative ions are generated, the purpose is to bring a state in which an excessive quantity of positive ions are present due to electric appliances or for other causes in a household back to a state in which well-balanced quantities of positive and negative ions are present, or to obtain a relaxing effect. Such switching is possible by the use of a single ion generating apparatus.

Advisably, the alternating-current impulse voltage applied to the first discharger is an alternating voltage waveform such that the voltage at the first induction electrode relative to the first discharging electrode starts with a positive polarity, and the alternating-current impulse voltage applied to the second discharger is an alternating voltage waveform such that the voltage at the second induction electrode relative to the second discharging electrode starts with a negative polarity. In other words, the crest level of the first wave of the voltage at the first induction electrode relative to the first discharge voltage is made higher to the positive polarity side, and the crest level of the first wave of the voltage at the second induction electrode relative to the second discharge voltage is made higher to the negative polarity side.

The voltage application circuit includes a first diode that has the cathode thereof connected to a reference potential (=grounded potential, described later in connection with embodiments) and has the anode thereof connected to the second discharging electrode, and a second diode that has the anode thereof connected to the reference potential and has the cathode thereof connected to the first discharging electrode. By permitting the choice of whether or not to connect the second diode to the reference voltage, whereas the alternating-current impulse voltage applied to the second discharge electrode is negatively biased, it is possible to choose whether the alternating-current impulse voltage applied to the first discharge electrode is positively biased or a non-biased alternating voltage waveform is applied thereto.

Advisably, the voltage application circuit includes a first diode that has the cathode thereof connected to a reference potential and has the anode thereof connected to the second discharging electrode, a second diode that, when the first discharger generates positive ions, has the anode thereof connected to the reference potential and has the cathode thereof connected to the first discharging electrode, and a third diode that, when the first discharger generates negative ions, has the cathode thereof connected to the reference potential and has the anode thereof connected to the first discharging electrode. Thus, whereas the alternating-current impulse voltage applied to the second discharge electrode is negatively biased, the alternating-current impulse voltage applied to the first discharge electrode is positively or negatively biased.

Advisably, the voltage application circuit includes a first transformer having a primary coil that is driven, a first secondary coil from which the alternating-current impulse voltage is applied to the first discharger, and a second secondary coil from which the alternating-current impulse voltage is applied to the second discharger, and the first and second secondary coils of the first transformer are arranged on both sides of the primary coil. This makes it possible to secure a distance between the first and second secondary coils, and thus to alleviate the direct influence of the magnetic field generated by one of the secondary coils on the other.

Advisably, the voltage application circuit includes a second transformer having a primary coil that is driven and a secondary coil from which the alternating-current impulse voltage is applied to the first discharger and a third transformer having a primary coil that is driven and a secondary coil from which the alternating-current impulse voltage is applied to the second discharger, and the secondary coil of the second transformer, the primary coil of the second transformer, the primary coil of the third transformer, and the secondary coil of the third transformer are arranged in this order. This makes it possible to secure a distance between the secondary coils of the second and third transformers, and thus to alleviate the direct influence of the magnetic field generated by one of the secondary coils on the other.

The primary coil of the second transformer and the primary coil of the third transformer may be connected in parallel. This makes the voltages applied to the first coils of the second and third transformers equal. Thus, by giving the second and third transformers the same characteristics, it is possible to make equal the absolute values of the alternating-current impulse voltages applied to the first and second dischargers.

The primary coil of the second transformer and the primary coil of the third transformer may be connected in series. This makes the currents flowing through the first coils of the second and third transformers equal. Thus, by giving the second and third transformers the same characteristics, it is possible to make equal the absolute values of the alternating-current impulse voltages applied to the first and second dischargers.

A flywheel diode may be connected to each of the primary coils of the second and third transformers. Then, the current that is produced by the voltage induced in the primary coil of the second transformer by the current flowing through the secondary coil of the second transformer flows back through the primary coil of the second transformer and through the flywheel diode connected thereto, and thus no longer influences the third transformer. Likewise, the current that is produced by the voltage induced in the primary coil of the third transformer by the current flowing through the secondary coil of the third transformer flows back through the primary coil of the third transformer and through the flywheel diode connected thereto, and thus no longer influences the second transformer. Accordingly, if a load variation or the like occurs in one of the dischargers, the variation does not influence the voltage applied to the other discharger, and thus the quantity of ions generated by the other discharger is prevented from varying.

In the ion generating elements constructed as described above, the discharge electrode contacts and the induction electrode contacts via which the predetermined voltage waveforms are applied to the discharge electrodes and the induction electrodes of the first and second dischargers are arranged also on the surface of the dielectric member but on the face opposite to the face on which the discharge electrodes are arranged so as not to hamper electric discharge and generation of ions. The number of contacts provided for the first and second dischargers is four in total. The contacts are so arranged that the contact for the first discharge electrode and the contact for the second discharge electrode between which the potential difference is lowest are located adjacent to and at a predetermined distance from each other. This helps obtain further enhance reliability.

Likewise, the first and second dischargers are arranged on the base member in such a way that the first discharge electrode and the second discharge electrode between which the potential difference is lowest are located at a predetermined distance from each other. This helps obtain further enhance reliability.

According to the present invention, an electric appliance is provided, advisably, with one of the ion generating apparatuses constructed as described above and a releaser (such as a fan) for releasing the ions generated by the ion generating apparatus. With this construction, it is possible to achieve, in addition to the functions of the electric appliance itself, the function of varying the quantity and balance of ions in the air by operating the incorporated ion generating apparatus and thereby produce a desired environment in a room.

The electric appliance constructed as described above generates $H^+(H_2O)_m$ as positive ions and $O_2^-(H_2O)_n$ as negative ions (where m and n are natural numbers, and denote accompaniment by a plurality of $H_2O$ molecules). By generating approximately equal quantities of $H^+(H_2O)_m$ and $O_2^-(H_2O)_n$ in the air in this way, it is possible to make the two types of ions attach to airborne bacteria and the like floating in the air and deactivate them by the action of a free radical, namely hydroxyl radical (.OH), generated as a result.

BRIEF DESCRIPTION OF DRAWINGS

FIGS. 1A to 1H are schematic diagrams showing examples of basic experiments of the independent ion release method according to the invention;

FIG. 7 is a diagram showing the results of other examples of basic experiments of the independent ion release method according to the invention;

BEST MODE FOR CARRYING OUT THE INVENTION

Figure 2A:
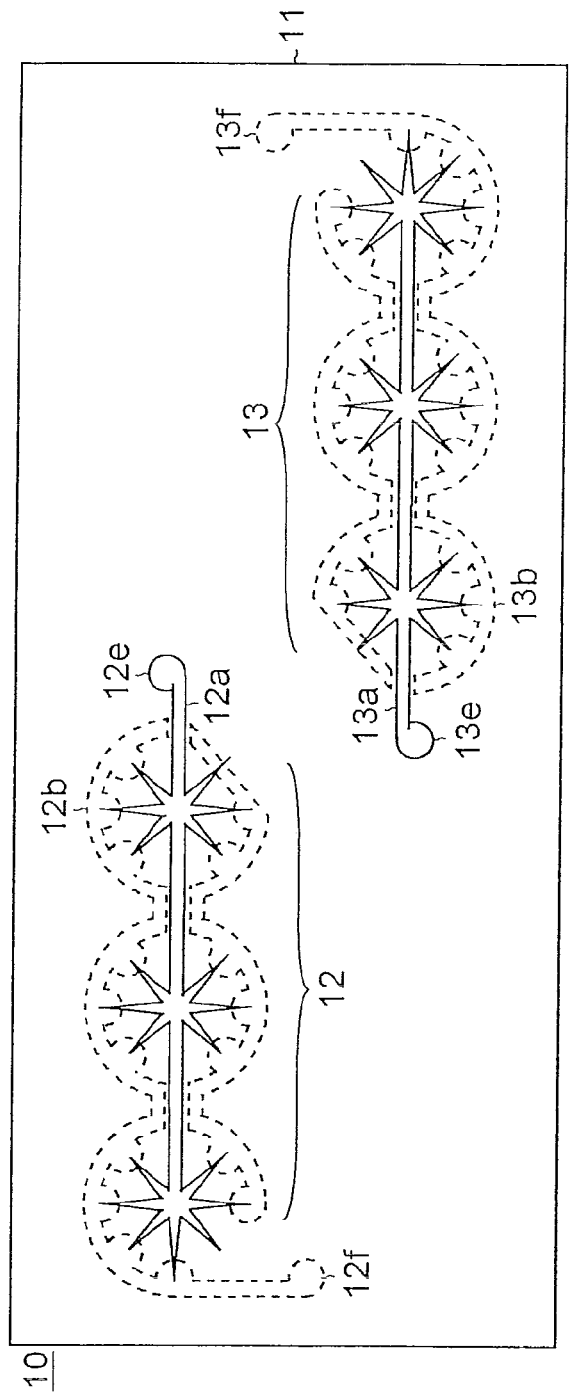
FIGS. 2A and 2B are schematic diagrams showing a first embodiment of an ion generating apparatus according to the invention.

In an ion generating apparatus according to the present invention, to alleviate the neutralization and vanishment of the generated positive and negative ions near the electrodes of the ion generating element, and to effectively release the generated ions of opposite polarities into a space, instead of a method of generating positive and negative ions alternately at predetermined time intervals by the use of a single ion generating element, a method of generating positive and negative ions separately by the use of a plurality of ion generating elements and discharging them independently into a room (hereinafter referred to as the independent ion release method) is adopted.

Prior to the adoption of the above-mentioned independent ion release method, basic experiments were conducted as described below. The ion generating element used in these experiments may employ needle-shaped electrodes. Here, however, it is assumed that a construction is adopted in which a pair of electrodes is formed by a discharge electrode formed on the surface of a dielectric member and an induction electrode buried in the dielectric member.

FIGS. 1A to 1H are schematic diagrams showing examples of basic experiments of the independent ion release method according to the invention. FIG. 1A is an external view of the ion generating element, FIG. 1B is a sectional view of the ion generating element, FIG. 1C shows the waveform of the voltage applied between the discharge and induction electrodes, and FIGS. 1D to 1G are diagrams showing different measurement conditions, and FIG. 1H shows an example of the arrangement of the ion generating element.

In the experiments, first, on one hand, by the use of the ion generating element 1 shown in FIGS. 1A and 1B, an alternating-current impulse voltage (FIG. 1C) was applied between the discharge electrode 0a and an induction electrode 0b thereof so that positive and negative ions were generated alternately at predetermined time intervals (FIG. 1D), and, on the other hand, by the use of the same ion generating element 1, a negatively-biased alternating-current impulse voltage was applied so that only negative ions were generated (not illustrated). In each of these cases, the quantity of ions released was measured to find whether there were any differences between the two cases. As a result, it was found that the total quantity of positive and negative ions detected in the former case was only about 50 to 60 [%] of the quantity of negative ions detected in the latter case.

Next, with the above results taken into consideration, two ion generating elements 1a and 1b, of which each was the same as the one used above, were arranged so that the two ion generating elements generated only positive and negative ions, respectively, and the total quantity of ions released was measured (FIGS. 1E to 1G).

As a result, it was found that the total quantity of positive and negative ions obtained under the measurement conditions shown in FIG. 1E was approximately equal to the sum of the quantities of positive and negative ions measured separately by the use of two ion generating elements as described above. This indicates that an ion generating element adopting the independent ion release method is more effective than one adopting the method of generating positive and negative ions alternately at predetermined time intervals by the use of a single ion generating element.

It should be noted that, In FIG. 1E, the arrangement of a first discharger (ion generating element 1a) and a second discharger (ion generating element 1b) is perpendicular to the wind stream from the fan 2, and thus the air stream that passes above one ion generating element never passes over the other.

On the other hand, in FIGS. 1F and 1G, where the arrangement is 90 degrees changed from FIG. 1E, i.e., where the arrangement of the ion generating elements 1a and 1b is parallel to the wind stream from the fan 2, it has been confirmed that the quantity of ions generated by the windward-side discharger diminishes. Specifically, in FIG. 1F, the positive ions generated by the windward-side ion generating element 1a passes above the leeward-side ion generating element 1b, and thus those positive ions are neutralized by the negative potential at the ion generating element 1b, resulting in a diminished quantity of positive ions. Likewise, in FIG. 1G, the negative ions generated by the windward-side ion generating element 1b diminishes. This indicates that, even when the independent ion release method is adopted, depending on the arrangement of the dischargers, ions may not be released effectively, resulting in a diminished quantity of ions of one type and thus ill-balanced quantities of positive and negative ions released.

Here, ions are measured by the use of an ion counter 3 that adopts the Gerdien double cylinder method, and the measured values are concentrations [ions/cc] at measurement points. The magnitude of the ion concentration obtained under the same conductions and at the same measurement point is measured, and therefore, in the present specification, a high or low ion concentration is referred to as the quantity of ions being large or small, respectively.

In a case where an ion generating apparatus is incorporated in an appliance, irrespective of whether the appliance blows a wind stream to the surface of the discharge electrodes on the dielectric member from the X- or Y-axis direction, to prevent the ions generated by the windward-side discharger from being neutralized on the leeward-side discharger of the opposite polarity, it is preferable, to alleviate neutralization, that the ion generating elements 1a and 1b be arranged on a diagonal line, i.e., obliquely, with respect to the X- or Y-axis direction (see FIG. 1H). This, however, is disadvantageous from the viewpoint of the area occupied, and therefore, in a case where the direction of the wind stream is fixed, it is preferable not to adopt a diagonal arrangement.

Figure 6A:
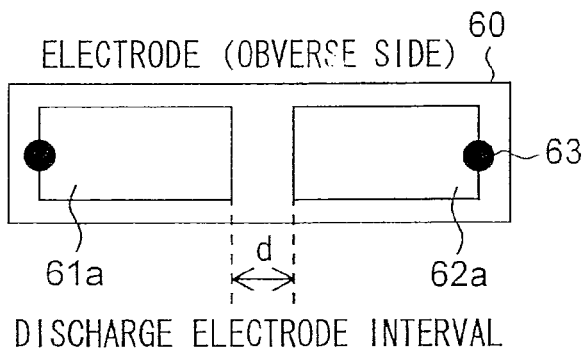
FIGS. 6A to 6D are schematic diagrams showing other examples of basic experiments of the independent ion release method according to the invention.

Also conducted were basic experiments for finding the relationship between the distance between the discharge electrode that generates positive ions and the discharge electrode that generates negative ions and the quantities of ions neutralized among the ions of the two types generated. FIGS. 6A to 6D are schematic diagrams showing other examples of basic experiments of the independent ion release method according to the invention. FIG. 6A is a diagram showing the arrangement of electrodes on the obverse face of an film electrode, FIG. B is a diagram showing the arrangement of electrodes on the reverse face of the film electrode, FIG. 6C is a diagram showing the waveform of the voltage applied between the discharge and induction electrodes, and FIG. 6D is a diagram showing the measurement conditions.

Figure 6B:
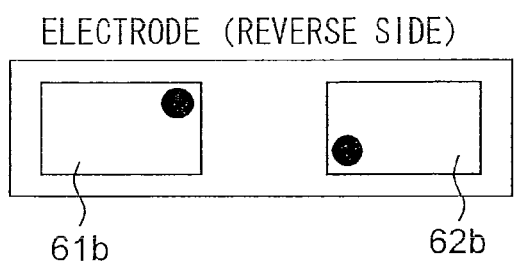
Figure 6C:
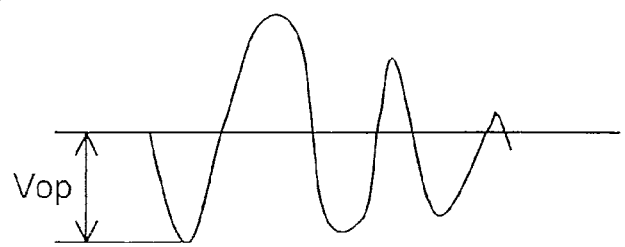
Figure 6D:
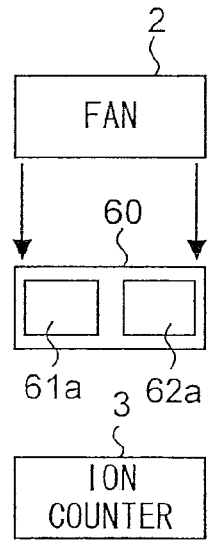

In FIGS. 6A to 6D, reference numeral 60 represents a film electrode having two electrodes formed on each of its obverse and reverse faces by printing and then etching copper on a polyimide film. On the obverse face, as shown in FIG. 6A, there are formed discharge electrodes 61a and 62a, each a substantially rectangular grid-patterned electrode, with a discharge electrode interval d left in between. On the reverse face, as shown in FIG. 6B, there are formed induction electrodes 61b and 62b, each a substantially rectangular solid plate electrode, in positions opposite to the discharge electrodes 61a and 62a. To prevent abnormal discharge at the edges of the discharge electrodes 61a and 62a, the induction electrodes 61b and 62b are formed smaller than and inside the discharge electrodes 61a and 62a.

The solid black circles shown on the electrodes are solder pads 63, and, via leads or the like soldered thereto, a high voltage is applied to the electrodes to generate ions. Between the discharge electrode 61a and the induction electrode 61b is applied an alternating-current impulse voltage having an alternating and gradually decreasing waveform as shown in FIG. 6C after being positive biased. Between the discharge electrode 62a and the induction electrode 62b is applied the same alternating-current impulse voltage after being negatively biased. As a result, positive ions are generated from the discharge electrode 61a, and negative ions are generated from the discharge electrode 62b. The crest level of the first wave of the applied alternating-current impulse voltage is about 3 kV.

A plurality of film electrodes 60 were produced with varying discharge electrode intervals d, and, with each of those film electrodes 60, as shown in FIG. 6D, the film electrode 60 was placed between the fan 2 and the ion counter 3, and the concentration of ions generated when the waveform obtained by positively or negatively biasing the above-mentioned alternating-current impulse voltage was applied were measured separately for positive and negative ions. Measurements were made separately in the case where only positive ions were generated, in the case where only negative ions were generated, and in the case in which both positive and negative ions were generated simultaneously. Here, the distance from the ion generating element 60 to the ion counter 3 was 25 cm, both placed 4.5 cm above the measurement table.

FIG. 7 shows the measurement results. When the measurements were made, the temperature was 27° C., and the humidity was 27%. These results show that, when the discharge electrode interval d is 5 mm or more, no spark (spark discharge) occurs between the discharge electrodes 61a and 62a. Moreover, when the discharge electrode interval d was 8 mm, the quantities of positive and negative ions were equal between when only positive or negative ions were generated and when both positive and negative ions were generated. This indicates that, under the conditions of the film electrodes used in the measurements, a discharge electrode interval d of 8 mm or more prevents the neutralization among the positive and negative ions generated. A larger discharge electrode interval d is more advantageous to preventing sparks and preventing the neutralization among ions of opposite polarities. However, increasing it results in increasing the size of the ion generating element. Accordingly, under the conditions described above, it is advisable to set the discharge electrode interval d at about 8 mm. It should be noted that, in these measurements, when samples of film electrodes with varying discharge electrode intervals d were produced, the discharge electrode interval d was secured by etching. Accordingly, in this portion, the coating layer that coats the surface of the electrodes was not present, and thus copper was exposed in parts of the edges at which the discharge electrodes faced each other. By contrast, in the actual electrodes described below, the presence of the coating layer is expected to permit the discharge electrode interval d to be made smaller.

Figure 2B:
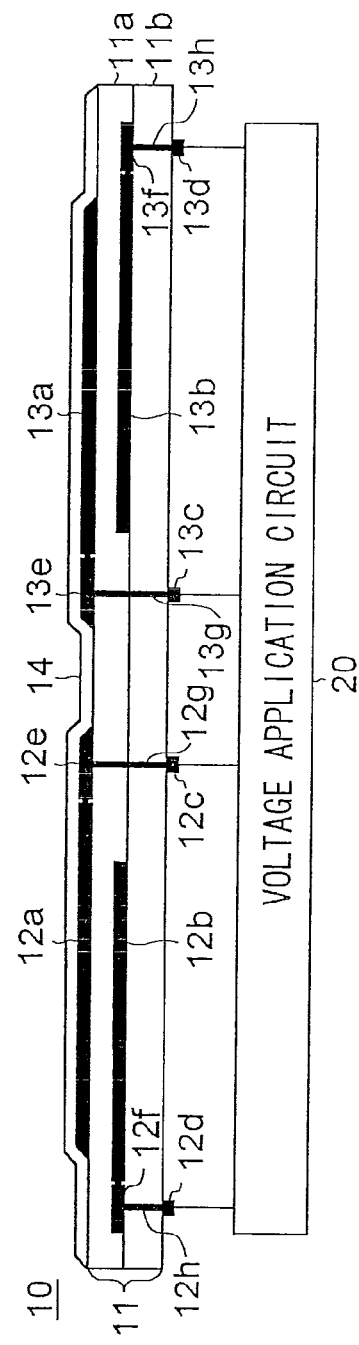

From the results of the basic experiments described above, it is now clear that it is preferable to alleviate neutralization by arranging the ion generating elements 1a and 1b on a diagonal line, i.e., obliquely, as shown in FIG. 1H. This (a diagonal arrangement) is realized in a first embodiment of the invention shown in FIGS. 2A and 2B. FIGS. 2A and 2B are diagrams schematically showing the construction of a first embodiment of an ion generating apparatus according to the invention. FIGS. 2A and 2B schematically show a plan view and a side view, respectively, of the ion generating apparatus.

As shown in FIGS. 2A and 2B, an ion generating apparatus according to the invention comprises an ion generating element 10 that is provided with a plurality of (in this embodiment, two) dischargers for generating ions and a voltage application circuit 20 that applies a predetermined voltage to the ion generating element 10.

The ion generating element 10 comprises a dielectric member 11 (an upper dielectric member 11a and a lower dielectric member 11b), a first discharger 12 (a discharge electrode 12a, an induction electrode 12b, a discharge electrode contact 12c, an induction electrode contact 12d, connection terminals 12e and 12f, and connection paths 12g and 12h), a second discharger 13 (a discharge electrode 13a, an induction electrode 13b, a discharge electrode contact 13c, an induction electrode contact 13d, connection terminals 13e and 13f, and connection paths 13g and 13h), and a coating layer 14. As will be described later, by applying a voltage between the first discharge electrode 12a and the first induction electrode 12b and another between the second discharge electrode 13a and the second induction electrode 13b, electric discharge is caused near the discharge electrodes 12a and 13a so as to generate positive and negative ions, respectively.

The dielectric member 11 (for example, 15 [mm] long, 37 [mm] wide, and 0.45 [mm] thick) is formed by bonding together the upper and lower dielectric members 11a and 11b, each having substantially the shape of a rectangular parallelepiped. In a case where the dielectric member 11 is formed of an inorganic material, it is formed of ceramic such as high-purity alumina, crystallized glass, forsterite, or steatite. In a case where the dielectric member 11 is formed of an organic material, it is formed of resin such as polyimide or glass epoxy that is highly resistant to oxidation. From the viewpoint of resistance to corrosion, it is preferable to use an inorganic material as the material of the dielectric member 11, and, from the viewpoint of formability and of facility of electrode formation, which will be described later, it is preferable to use ceramic.

It is desirable that the insulation resistance between the discharge electrodes 12a and 13a and the induction electrodes 12b and 13b be uniform, and therefore it is preferable to use as the material of the dielectric member 11 one whose density does not vary much and whose insulation factor is uniform.

The dielectric member 11 may be given any other shape than substantially the shape of a rectangular parallelepiped (for example, the shape of a circular or elliptic plate, or the shape of a polygonal plate), and may even be given a cylindrical shape. From the viewpoint of productivity, however, it is preferable to give it the shape of a flat plate (including the shapes of a circular plate and of a rectangular parallelepiped).

The first and second dischargers 12 and 13 are arranged on a diagonal line (obliquely) with respect to the shape of the dielectric member 11 so as not to be located on a straight line. More functionally defined, the arrangement of the first and second dischargers 12 and 13 is such that, no matter from which direction an air stream may be blown to the ion generating element 10 of this embodiment, the direction of their arrangement is perpendicular to the air stream, in other words, such that the air stream that has passed above one discharger does not pass above the other discharger. With this construction, it is possible to make the most of the independent ion release method, and to alleviate the reduction of the ions generated by the two dischargers 12 and 13 and thereby achieve efficient and well-balanced release of ions.

The discharge electrodes 12a and 13b are formed on the surface of the upper dielectric member 11a integrally therewith. The discharge electrodes 12a and 13a may be formed of any material such as tungsten that is electrically conductive, provided that the material is not deformed as by being melted by electric discharge.

The induction electrodes 12b and 13b are arranged parallel to the discharge electrodes 12a and 13a with the upper dielectric member 11a sandwiched in between. This arrangement permits the distance between the discharge electrodes 12a and 13a and the induction electrodes 12b and 13b (hereinafter referred to as the interelectrode distance) fixed. Thus, it is possible to uniformize the insulation resistance between those electrodes, thereby to stabilize the state of electric discharge, and thus to generate positive and/or negative ions appropriately. It should be noted that, in a case where the dielectric member 11 is given a cylindrical shape, it is possible to keep the above-mentioned interelectrode distance fixed by forming the discharge electrodes 12a and 13a on the outer circumferential surface of the cylinder and forming the induction electrodes 12b and 13b in the shape of a shaft.

The induction electrodes 12b and 13b, like the discharge electrodes 12a and 13a, may be formed of any material such as tungsten that is electrically conductive, provided that the material is not deformed as by being melted by electric discharge.

The discharge electrode contacts 12c and 13c electrically conduct to the discharge electrodes 12a and 13a via the connection terminals 12e and 13e and the connection paths 12g and 13g formed on the same formation surface as the discharge electrodes 12a and 13a (i.e., on the surface of the upper dielectric member 11a). Accordingly, by connecting one ends of leads (copper or aluminum leads) to the discharge electrode contacts 12c and 13c, and then connecting the other ends of those leads to the voltage application circuit 20, it is possible to make the discharge electrodes 12a and 13a electrically conduct to the voltage application circuit 20.

The induction electrode contacts 12d and 13d electrically conduct to the induction electrodes 12b and 13b via the connection terminals 12f and 13f and the connection paths 12h and 13h formed on the same formation surface as the induction electrodes 12b and 13b (i.e., on the surface of the lower dielectric member 11b). Accordingly, by connecting one ends of leads (copper or aluminum leads) to the induction electrode contacts 12d and 13d, and then connecting the other ends of those leads to the voltage application circuit 20, it is possible to make the induction electrodes 12b and 13b electrically conduct to the voltage application circuit 20.

It is preferable that the discharge electrode contacts 12c and 13c and the induction electrode contacts 12d and 13d be all formed not on the surface of the dielectric member 11 but on a face other than the one (hereinafter referred to as the top face of the dielectric member 11) on which the discharge electrodes 12a and 13a are formed. With this construction, no unnecessary leads are arranged on the top face of the dielectric member 11, and thus the air stream from the fan (not illustrated) is less likely to be disturbed. This makes it possible to obtain the effects of the independent ion release method according to the invention to the full.

Out of the above considerations, in the ion generating element 10 of this embodiment, the discharge electrode contacts 12c and 13c and the induction electrode contacts 12d and 13d are all formed on the face (hereinafter referred to as the bottom face of the dielectric member 11) of the dielectric member 11 opposite to the top face thereof.

It should be noted that, in the ion generating element 10 of this embodiment, the first discharge electrode 12a and the second discharge electrode 13a have acute-angled corners so that the electric field concentrates there to cause localized electric discharge. Needless to say, it is possible to use any other pattern than specifically shown in the figures so long as it can concentrate the electric field. The same is true with FIGS. 3, 4A, and 4B.

Figure 3:
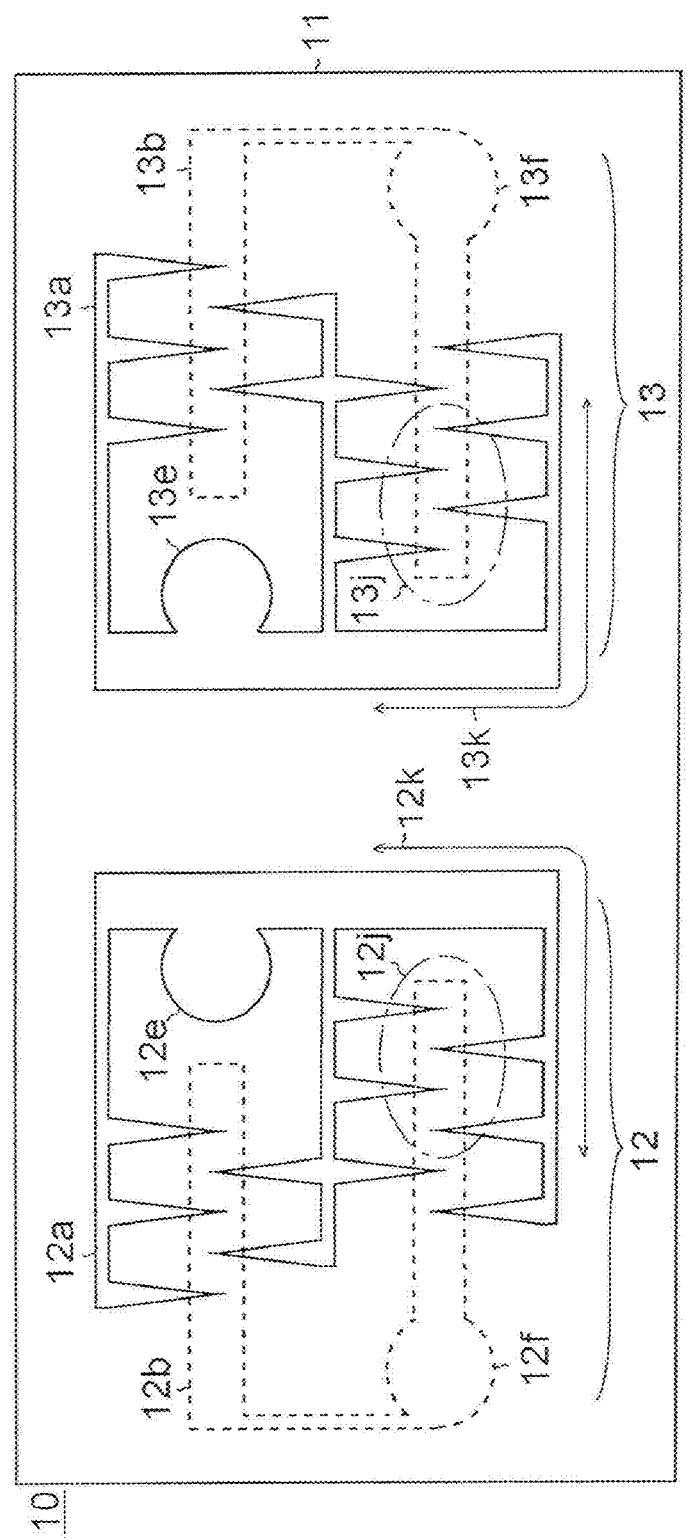
FIG. 3 is a schematic diagram showing a second embodiment of an ion generating apparatus according to the invention.

FIG. 3 is a schematic plan view showing a second embodiment of an ion generating apparatus according to the invention. The structure as seen in a sectional view is largely the same as that shown in FIG. 2B. The embodiment shown in FIG. 3 is one in which, due to restrictions on the available area, the first and second discharging portions are not arranged on a diagonal line with respect to the shape of the dielectric member 11 serving as the base member.

The first discharge electrode 12a divides into a first discharging portion 12j for causing concentration of the electric field and thereby causing electric discharge, a first conducting portion 12k surrounding the perimeter or a part thereof, and the connection terminal 12e mentioned earlier. All these portions are formed in a single pattern, so that the voltages applied thereto are equal. Likewise, the second discharge electrode 13a divides into a second discharging portion 13j, a second conducting portion 13k, and the connection terminal 12e mentioned earlier.

Positive ions are generated at the first discharging portion 12j, which is at a positive potential. Right next thereto is located the second discharging portion 13j, which is at a negative potential.

The distinctive feature here is that the first and second conducting portions 12k and 13k are so arranged as to surround the perimeters or parts of the first and second discharge portions 12ja and 13j, which cause electric discharge. As a result of the first conducting portion 12k, which is at the same voltage as the first discharging portion 12j, being arranged to surround the perimeter or a part of the first discharging portion 12j, the positive ions generated from the first discharging portion 12j are repelled by the first conducting portion 12k at a positive potential before reaching the second discharging portion 13j at the opposite polarity, i.e., at a negative potential. This alleviates the incidence of the positive ions reaching the second discharging portion 13j. The same is true with the second conducting portion 13k. It should be noted that, in a case where the direction of the air stream or the distance between the first and second discharge electrodes 12a and 13a is such that almost no neutralization occurs among the generated ions, there is no need to provide the first and second conducting portions 12k and 13k described above, through these constitute a characterizing feature.

Figure 4A:
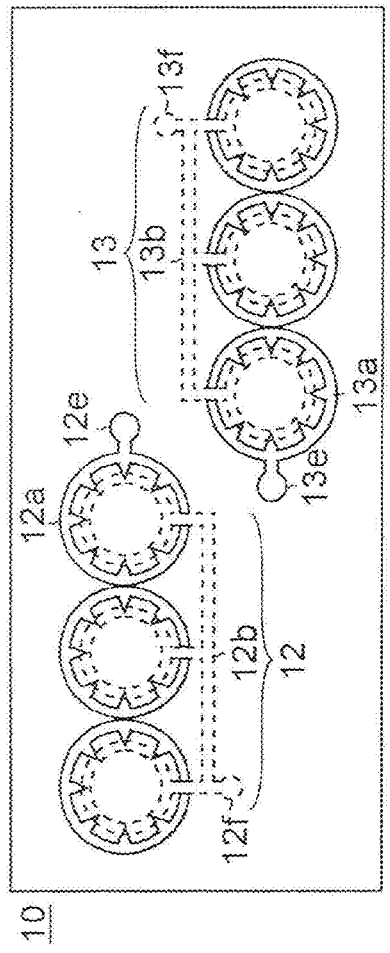
FIGS. 4A and 4B are schematic diagrams showing a third embodiment of an ion generating apparatus according to the invention.
Figure 4B:
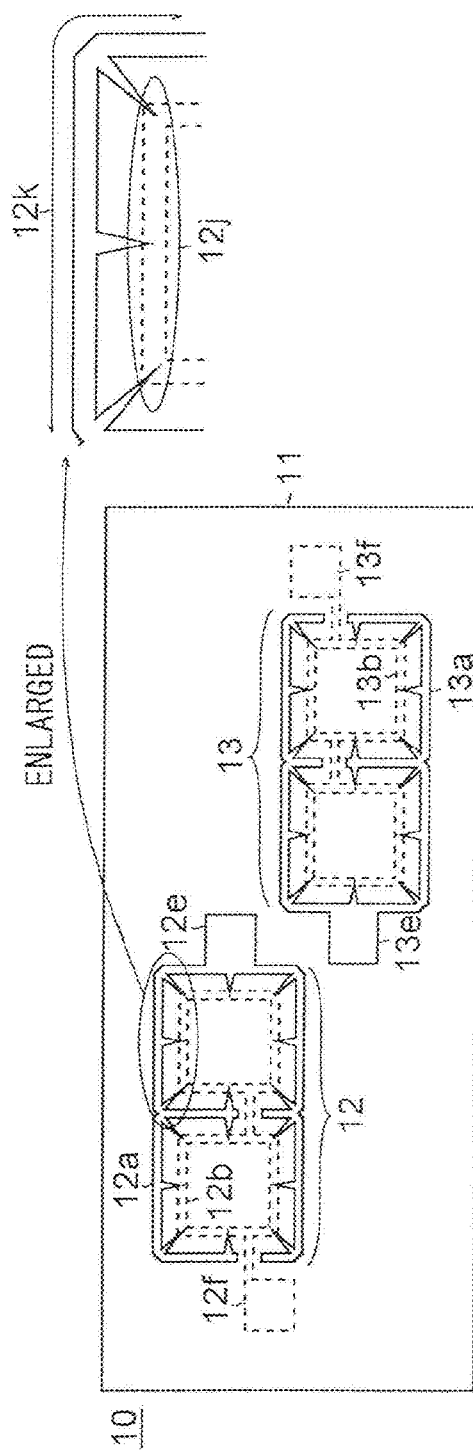

FIGS. 4A and 4B are schematic plan views showing a third embodiment of an ion generating apparatus according to the invention. The structure as seen in a sectional view is largely the same as that shown in FIG. 2B. The ion generating apparatus shown in FIGS. 4A and 4B has the same features as the second embodiment described above, and in addition has electrodes arranged on a diagonal line with respect to the shape of the dielectric member 11 serving as the base member as described earlier. As described earlier, the electrodes may be needle-shaped electrodes, but, basically, this embodiment assumes the use of a pair of electrodes consisting of a discharge electrode formed on the surface of a dielectric member and an induction electrode buried in the dielectric member.

In a fourth embodiment of the invention, in the ion generating apparatuses shown in FIGS. 2A, 2B, 3, 4A, and 4B, the first discharge electrode 12a, the first induction electrode 12b, the second discharge electrode 13a, and the second induction electrode 13b are arranged on the dielectric member 11 in the following manner. The first and second electrodes are arranged next to each other not simply in such a way that insulation is secured between them, but further, with the applied voltage taken into consideration, in such a way that insulation is secured between the first discharge electrode 12a and the second discharge electrode 13a, i.e., those of all the electrodes between which the potential difference is the smallest. In other words, the electrodes are arranged next to each other in such a way that insulation is secured between the combination of electrodes between which the potential difference is smallest. The voltage differences and waveforms will be described later.

The shapes of the electrodes shown in FIGS. 2A, 3, 4A, and 4B are mere examples, and the electrodes may be shaped as shown in FIGS. 8 to 11. FIGS. 8 to 11 are schematic plan views showing a fifth to an eighth embodiment, respectively, of ion generating apparatuses according to the invention. In FIGS. 8 to 11, such components as are found also in FIG. 3 are identified with the same reference numerals, and their explanations will not be repeated. The structures as seen in a sectional view are largely the same as that shown in FIG. 2B.

Figure 8:
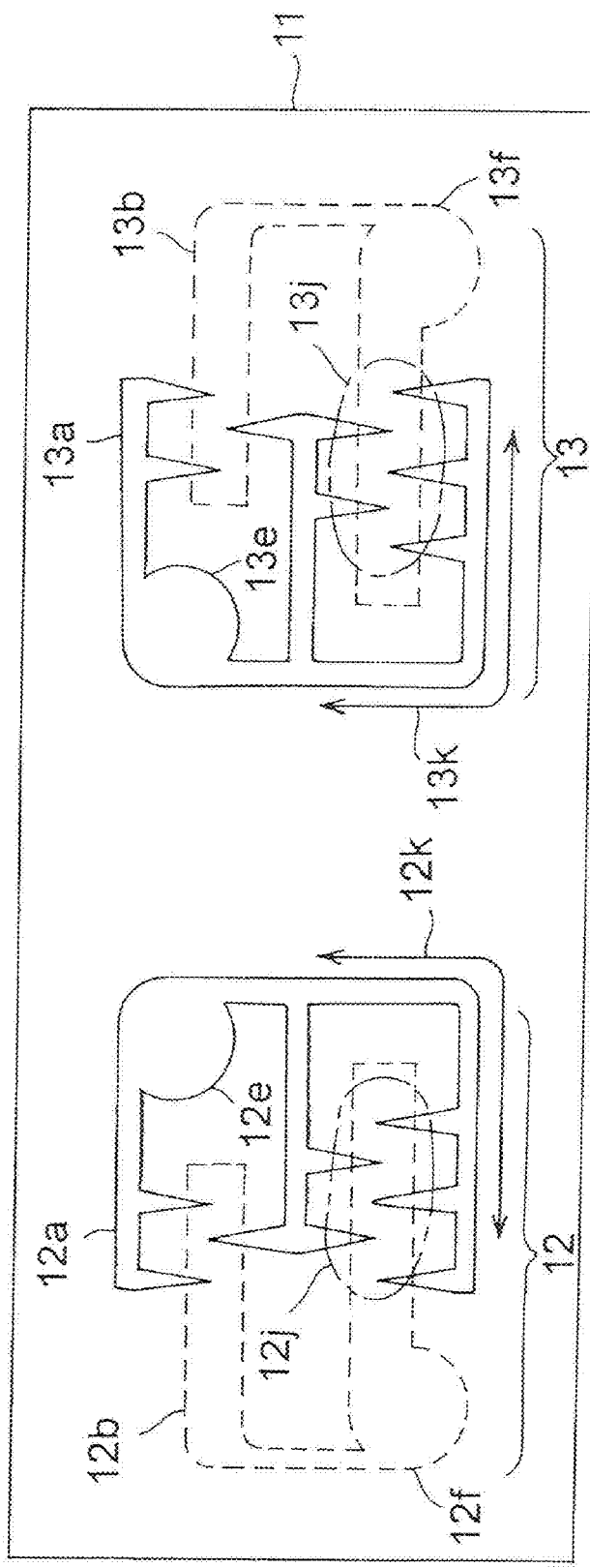
FIG. 8 is a schematic diagram showing a fifth embodiment of an ion generating apparatus according to the invention.
Figure 9:
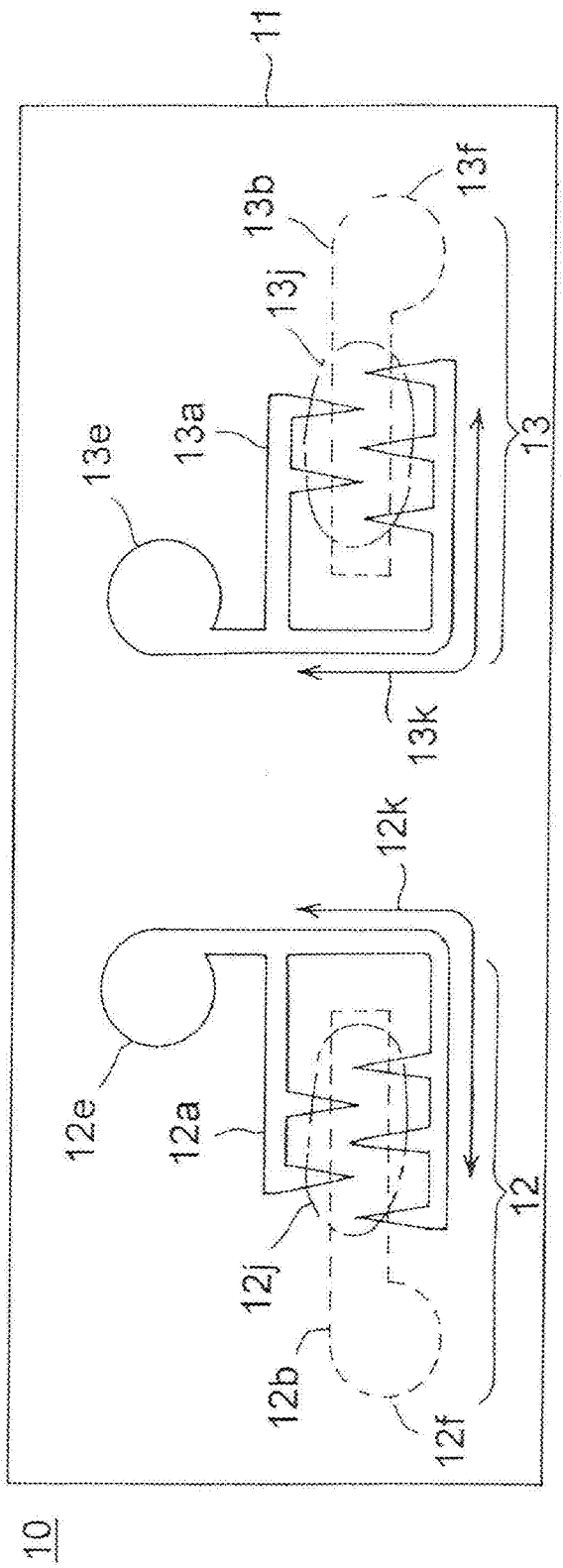
FIG. 9 is a schematic diagram showing a sixth embodiment of an ion generating apparatus according to the invention.
Figure 10:
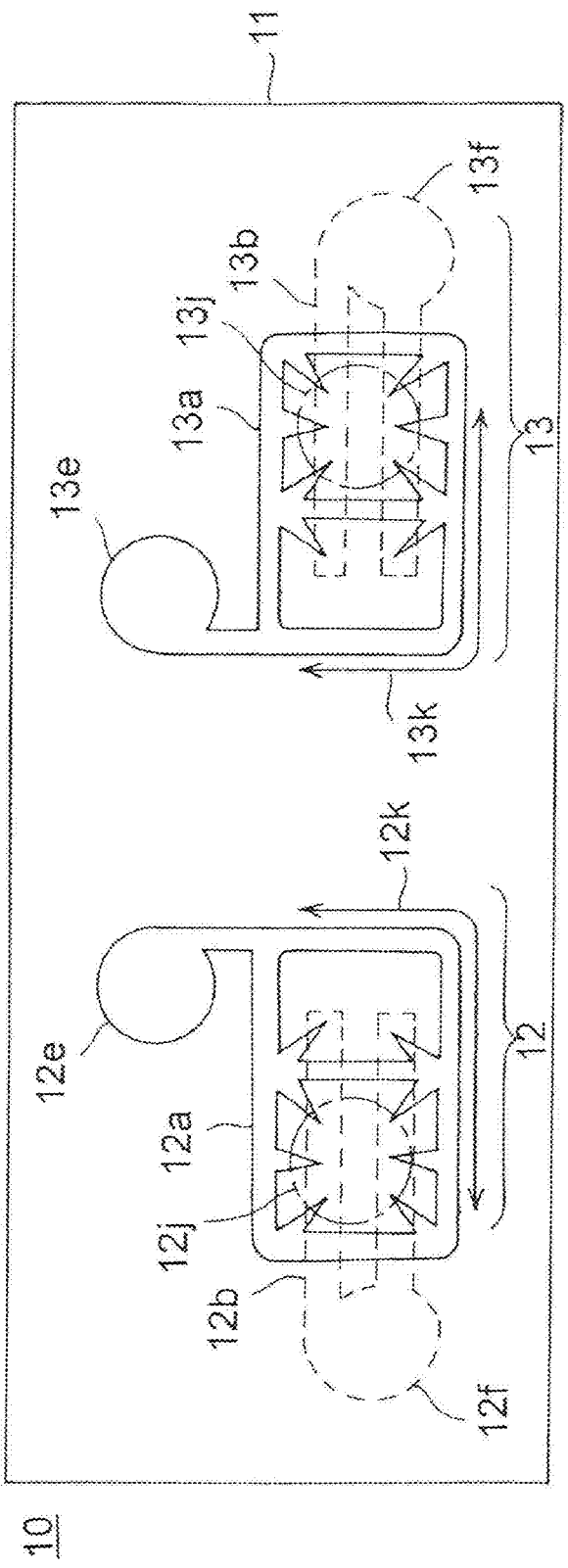
FIG. 10 is a schematic diagram showing a seventh embodiment of an ion generating apparatus according to the invention.
Figure 11:
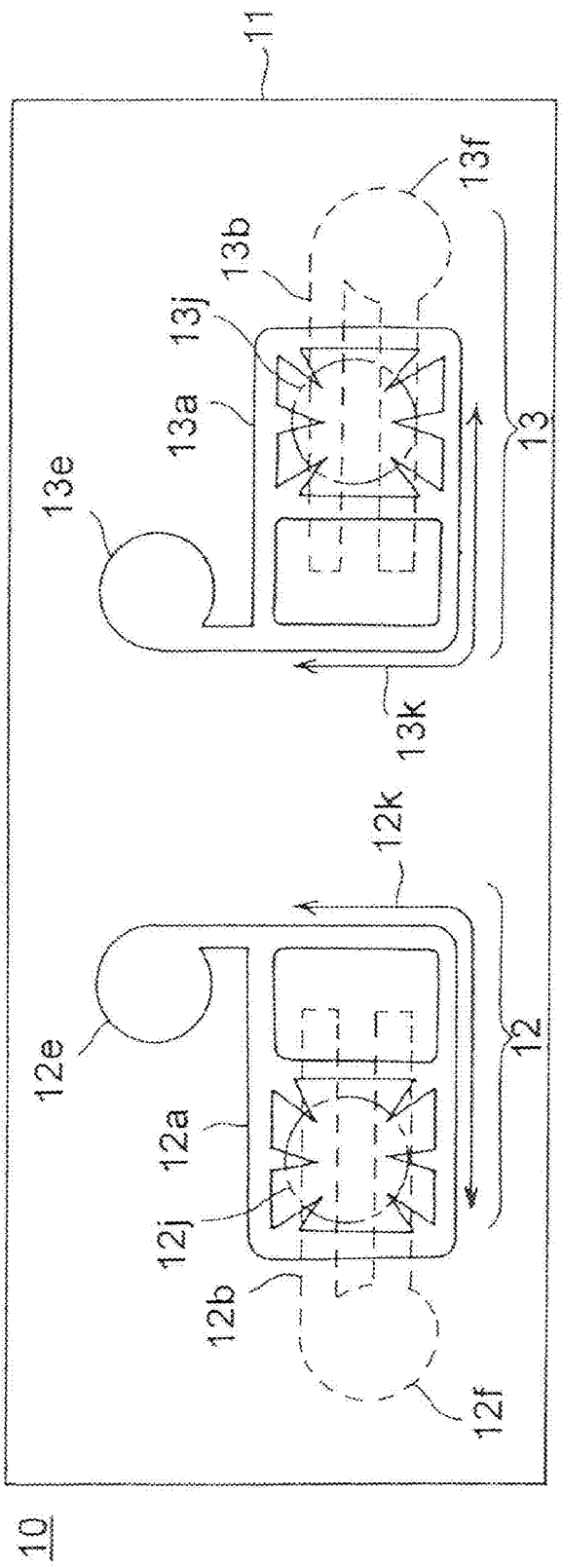
FIG. 11 is a schematic diagram showing an eighth embodiment of an ion generating apparatus according to the invention.

In the ion generating apparatus 10 shown in FIG. 8, the individual electrodes are made so small that the first and second discharge electrodes 12a and 13a are not located too close to an edge. In the ion generating apparatus 10 shown in FIG. 9, to permit adjustment of the discharge spots, the number of first and second discharge electrodes 12a and 13a are reduced as compared with their number in the ion generating element 10 shown in FIG. 8. In the ion generating apparatuses 10 shown in FIGS. 10 and 11, to permit adjustment of the discharge spots, the first and second discharge electrodes 12a and 13a of the ion generating apparatus 10 shown in FIG. 9 are so modified as to have shapes closer to the shapes of the first and second discharge electrodes 12a and 13a of the ion generating apparatus 10 shown in FIG. 2.

Next, the configuration and operation of the voltage application circuit 20 will be described.

Figure 5A:
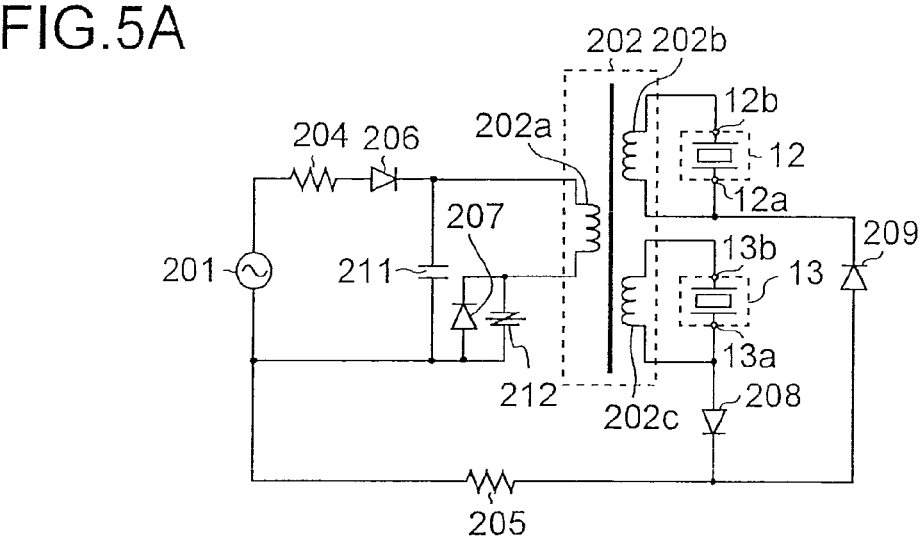
FIGS. 5A to 5G are circuit diagrams and voltage waveform diagrams showing an embodiment of the voltage application circuit.
Figure 5B:
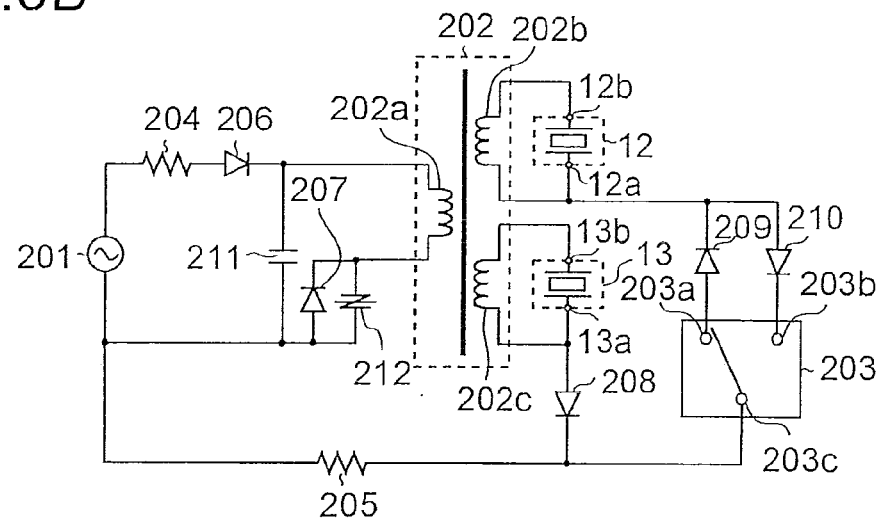

FIGS. 5A and 5B are circuit diagrams showing embodiments of the voltage application circuit 20. First, the voltage application circuit 20 shown in FIG. 5A will be described. The voltage application circuit 20 shown in FIG. 5A comprises, as a primary-side drive circuit, an input power source 201, an input resistor 204, a rectifying diode 206, a transformer drive switching device 212, a capacitor 211, and a diode 207. In a case where the input power source 201 is commercially distributed alternating-current power, the voltage of the input power source 201 charges the capacitor 211 through the input resistor 204 and the rectifying diode 206. When the voltage here becomes higher than a prescribed voltage, the transformer drive switching device 212 turns on and applies the voltage to a primary coil 202a of a transformer 202. Immediately thereafter, the energy accumulated in the capacitor 211 is discharged through the primary coil 202a of the transformer 202 and the transformer drive switching device 212. This turns the voltage across the capacitor 211 back to zero, and then charging starts again. In this way, charging and discharging are repeated at prescribed time intervals. In the above description, the transformer drive switching device 212 is assumed to be a no-gate, two-terminal thyristor (a "Sidac" manufactured by Shindengen Electric Manufacturing Co., Ltd., Japan). It is, however, also possible to adopt a slightly different circuit configuration using a thyristor (SCR). The input power source 201 may be a direct-current power source so long as the circuit is so configured as to operate in a similar way as described above. That is, the primary-side drive circuit of the circuit may be configured in any manner so long as it operates in a similar way.

The transformer 202 has, as a secondary-side circuit, two secondary coils 202b and 202c, and these are connected respectively to the first discharge electrode 12a, the first induction electrode 12b, the second discharge electrode 13a, and the second induction electrode 13b shown in one of FIGS. 2A, 2B, 3, 4A, 4B, and 8 to 11. When the transformer drive switching device 212 in the primary-side circuit turns on, the energy on the primary side is transmitted to the secondary coils 202b and 202c of the transformer, causing an impulse-shaped voltage to appear therein. To the first discharge electrode 12a is connected not only the secondary coil 202b of the transformer 202 but also the cathode of a diode 209. The anode of the diode 209 is, through a resistor 205, grounded or connected to one side (the reference potential) of the input power source 201. In a case where the input power source 201 is commercially distributed alternating-current power, since one side of the commercially distributed alternating-current input power is grounded in Japan, connecting an electric appliance or the like without a grounding terminal to one side of the input power source 201 is equivalent to grounding it. Even if the plug is inserted in an outlet in the wrong way, simply a voltage of 100 V is superimposed, and the electric appliance or the like is grounded all the same. The resistor 205 is for protection, and therefore omitting (or short-circuiting) it does not affect the operation in any way. To the second discharge electrode 13a is connected not only the secondary coil 202c of the transformer but also the anode of a diode 208. The cathode of the diode 208 is, through the resistor 205, grounded or connected to one side of the input power source 201.

Next, the differently configured voltage application circuit 20 shown in FIG. 5B will be described. The primary-side circuit of the transformer 202 is the same as described above. The transformer 202 has, as a secondary-side circuit, two secondary coils 202b and 202c, and these are connected respectively to the first discharge electrode 12a, the first induction electrode 12b, the second discharge electrode 13a, and the second induction electrode 13b shown in one of FIGS. 2A, 2B, 3, 4A, 4B, and 8 to 11. When the transformer drive switching device 212 in the primary-side circuit turns on, the energy on the primary side is transmitted to the secondary coils 202b and 202c of the transformer, causing an impulse-shaped voltage to appear therein. To the first discharge electrode 12a are connected not only the secondary coil 202b of the transformer 202 but also the cathode of a diode 209 and the anode of a diode 210. The anode of the diode 209 is connected to one selection terminal 203a of a switching relay 203, and the cathode of the diode 210 is connected to another selection terminal 203b of the switching relay 203. A common terminal 203c of the switching relay 203 is, through a resistor 205, grounded or connected to one side of the input power source 201.

Figure 5C:
Figure 5D:
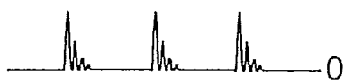
Figure 5E:
Figure 5F:
Figure 5G:

Next, the operation voltage waveforms will be described. Between both ends of each of the secondary coils 202b and 202c of the transformer 202, there appears an alternating voltage impulse waveform as shown in FIG. 5C. The diodes 209 and 208 connected to the secondary coils 202b and 202c point in opposite directions as described above, and accordingly the voltage waveforms at the first discharge electrode 12a, the first induction electrode 12b, the second discharge electrode 13a, and the second induction electrode 13b relative to the grounding terminal, or in some cases relative to one side of the input power source 201 (the reference potential, i.e., the side to which the diodes 208 and 209 are connected), are as shown in FIGS. 5D, 5E, 5F, and 5G, i.e., positively or negatively biased versions of the waveform shown in FIG. 5C.

In the embodiment shown in FIG. 5A, the potentials at the first discharge electrode 12a and the first induction electrode 12b relative to the grounding terminal, or in some cases relative to one side of the input power source 201 (the reference potential, i.e., the side to which the diodes 208 and 209 are connected), are both positive. Thus, here, of all the ions generated, negative ions are neutralized on the first discharge electrode 12a, and positive ions are repelled and thereby released. On the other hand, the potentials at the second discharge electrode 13a and the second induction electrode 13b relative to the grounding terminal, or in some cases relative to one side of the input power source 201 (the reference potential, i.e., the side to which the diodes 208 and 209 are connected), are both negative. Thus, here, negative ions are released.

On the other hand, in the embodiment shown in FIG. 5B, when the switching relay 203 is switched to the selection terminal 203a, the potentials at the first discharge electrode 12a and the first induction electrode 12b relative to the grounding terminal, or in some cases relative to one side of the input power source 201 (the reference potential, i.e., the side to which the diodes 208 and 209 are connected), are both positive. Thus, here, positive ions are generated. When the switching relay 203 is switched to the selection terminal 203b, however, the potentials at those same terminals relative to the grounding terminal, or in some cases relative to one side of the input power source 201 (the reference potential, i.e., the side to which the diodes 208 and 209 are connected), are both negative. Thus, here, negative ions are generated. The potentials at the second discharge electrode 13a and the second induction electrode 13b relative to the grounding terminal, or in some cases relative to one side of the input power source 201 (the reference potential, i.e., the side to which the diodes 208 and 209 are connected), are both negative. Thus, here, negative ions are released.

The positive ions are $H^+(H_2O)_m$ and the negative ions are $O_2^-(H_2O)_n$ (where m and n are natural numbers, and denote accompaniment by a plurality of $H_2O$ molecules).

As described above, when the switching relay 203 is switched to the selection terminal 203a, the ions generated from the first discharger 12 are positive, and thus, together with the negative ions generated from the second discharger 13, substantially equal quantities of positive and negative ions are generated. When substantially equal quantities of $H^+(H_2O)_m$ and $O_2^-(H_2O)_n$ are released into the air, those ions surround airborne mold spores and viruses floating in the air, and thus it is possible to deactivate them by the action of a free radical, namely hydroxyl radical (.OH), generated as a result.

How this happens will be described in more detail below. When an alternating-current voltage is applied between the electrodes of the first and second dischargers 12 and 13, oxygen or moisture in the air receives energy and ionizes, producing ions consisting chiefly of $H^+(H_2O)_m$ (where m is an arbitrary natural number) and $O_2^-(H_2O)_n$ (where n is an arbitrary natural number). These ions are released into a space by a fan or the like. The ions $H^+(H_2O)_m$ and $O_2^-(H_2O)_n$ attach to the surface of airborne germs and, through a chemical reaction, produce a free radical, namely $H_2O_2$ or (.OH). Since $H_2O_2$ or (.OH) exhibits extremely powerful reactivity, it is possible, by surrounding bacteria present in the air with such a substance, to deactivate them. Here, (.OH) represents radical OH, a type of a free radical.

On the surface of the cells of airborne bacteria, positive and negative ions undergo a chemical reaction expressed by Formulae (1) to (3) below to produce a free radical, namely hydrogen oxide $H_2O_2$ or hydroxyl radical (.OH). Here, in Formulae (1) to (3), m, m', n, and n' each represent an arbitrary natural number. As a result, airborne bacteria are destroyed by the decomposing action of the free radical. In this way, it is possible to efficiently deactivate and remove airborne bacteria present in the air.

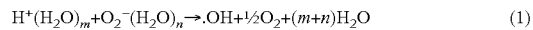

(1)

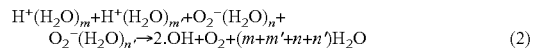

(2)

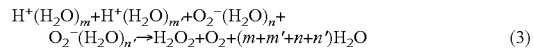

(3)

On the principle described above, by releasing positive and negative ions, it is possible to obtain an effect of deactivating airborne germs and the like.

The Formulae (1) to (3) above can produce a similar effect on the surface of toxic substances present in the air. Thus, it is possible to oxidize or decompose toxic substances by the action of the free radical, namely $H_2O_2$ or (.OH). In this way, it is possible to make chemical substances such as formaldehyde and ammonia substantially harmless by turning them into nontoxic substances such as carbon dioxide, water, and nitrogen.

Thus, by driving a blower fan, it is possible to release the positive and negative ions generated by the ion generating element 1 out of the body. Then, by the action of these positive and negative ions, it is possible to deactivate mold and germs present in the air and thereby suppress their proliferation.

Positive and negative ions also have an effect of deactivating viruses such as coxsackie virus and polio virus, and thus help prevent pollution by such viruses.

Moreover, positive and negative ions have also been confirmed to have an effect of decomposing odor-generating molecules, and thus help deodorize a space.

On the other hand, when the switching relay 203 is switched to the selection terminal 203b, the ions generated from the first discharger 12 are negative, and thus, together with the negative ions generated from the second discharger 13, negative ions are generated from both electrodes. This is effective to supply a large quantity of negative ions into a space in which an excessive quantity of positive ions are present due to electric appliances or for other causes in a household back to a state in which well-balanced quantities of positive and negative ions are present as in a wild forest, or to obtain a relaxing effect.

The voltage application circuit 20 has only to apply an alternating voltage waveform starting with the positive polarity and an alternating voltage waveform starting with the negative polarity respectively between the first discharge electrode 12a and the first induction electrode 12b and between the second discharge electrode 13a and the second induction electrode 13b shown in one of FIGS. 2A, 2B, 3, 4A, 4B, and 8 to 11. Accordingly, the voltage application circuit 20 may be configured in any other manner than shown in FIGS. 5A and 5B; for example, it may adopt a configuration shown in FIG. 12 or 13.

Figure 12:
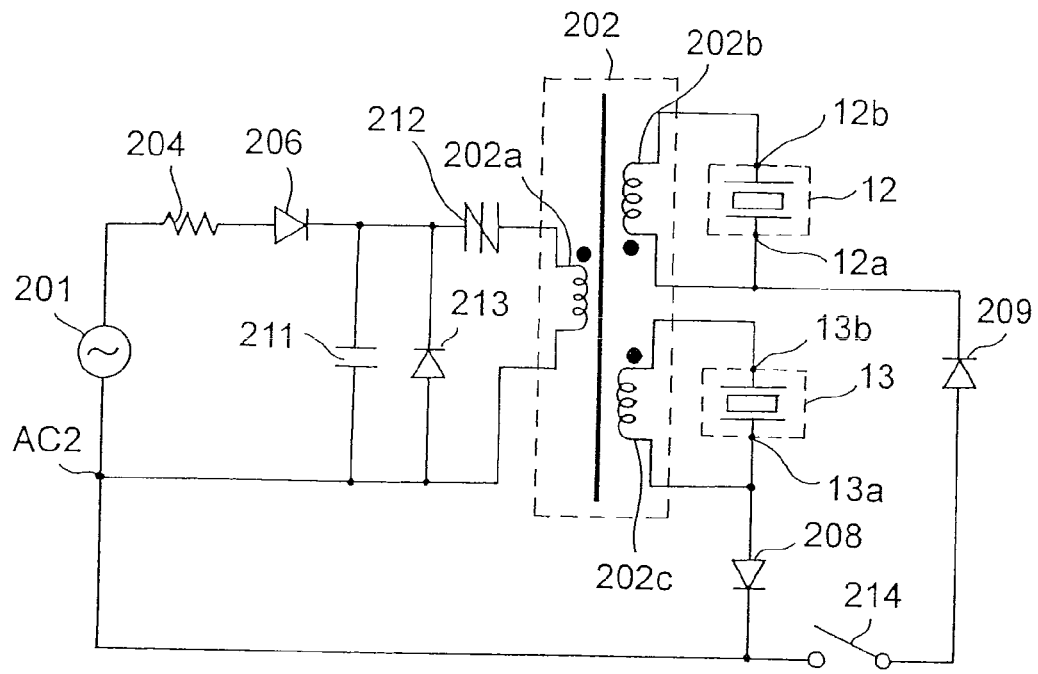
FIG. 12 is a circuit diagram showing another embodiment of the voltage application circuit.

FIG. 12 shows a modified version of the circuit shown in FIG. 5B which is so configured as to be more inexpensive and to require less components. To simplify the description, such components as are found also in the embodiment shown in FIG. 5B are identified with the same reference numerals. The voltage application circuit 20 shown in FIG. 12 comprises, as a primary-side drive circuit, an input power source 201, an input resistor 204, a rectifying diode 206, a transformer drive switching device 212, a capacitor 211, and a flywheel diode 213. In a case where the input power source 201 is commercially distributed alternating-current power, the voltage of the input power source 201 charges the capacitor 211 through the input resistor 204 and the rectifying diode 206. When the voltage here becomes higher than a prescribed voltage, the transformer drive switching device 212 turns on and applies the voltage to a primary coil 202a of a transformer 202. Immediately thereafter, the energy accumulated in the capacitor 211 is discharged through the transformer drive switching device 212 and the primary coil 202a of the transformer 202. This turns the voltage across the capacitor 211 back to zero, and then charging starts again. In this way, charging and discharging are repeated at prescribed time intervals.

The transformer 202 has, as a secondary-side circuit, two secondary coils 202b and 202c, and these are connected respectively to the first discharge electrode 12a, the first induction electrode 12b, the second discharge electrode 13a, and the second induction electrode 13b shown in one of FIGS. 2A, 2B, 3, 4A, 4B, and 8 to 11. When the transformer drive switching device 212 in the primary-side circuit turns on, the energy on the primary side is transmitted to the secondary coils 202b and 202c of the transformer, causing an impulse-shaped voltage to appear therein. It should be noted that, here, the secondary coils and the electrodes are so connected that the polarity of the voltage applied between the first discharge electrode 12a and the first induction electrode 12b is opposite to the polarity of the voltage applied between the second discharge electrode 13a and the second induction electrode 13b.

To the first discharge electrode 12a is connected not only the secondary coil 202b of the transformer 202 but also the cathode of a diode 209. The anode of the diode 209 is, through a relay 214, grounded or connected to one side (a line AC2, i.e., the reference potential) of the input power source 201. In a case where the input power source 201 is commercially distributed alternating-current power, since one side of the commercially distributed alternating-current input power is grounded in Japan, connecting an electric appliance or the like without a grounding terminal to one side of the input power source 201 is equivalent to grounding it. To the second discharge electrode 13a is connected not only the secondary coil 202c of the transformer but also the anode of a diode 208. The cathode of the diode 208 is grounded or connected to one side (the line AC2) of the input power source 201.

Next, the operation voltage waveforms will be described. Between both ends of each of the secondary coils 202b and 202c of the transformer 202, there appears an alternating voltage impulse waveform. Here, the voltage waveform at the first induction electrode 12b relative to the first discharge electrode 12a is an alternating voltage waveform starting with the positive polarity as shown in FIG. 14A, and the voltage waveform at the second induction electrode 13b relative to the second discharge electrode 13a is an alternating voltage waveform starting with the negative polarity as shown in FIG. 14B.

Moreover, since the secondary coil 202c is connected through the diode 208, which points in the forward direction, to the line AC2 (in some cases, to the grounding terminal). Thus, the voltage waveform at the second discharge electrode 13a and the voltage waveform at the second induction electrode 13b relative to the line AC2 are as shown in FIGS. 15A and 15B, respectively, i.e., negatively biased versions of the waveform shown in FIG. 14B. Accordingly, negative ions are generated from the second discharger 13. The negative ions are $O_2^-(H_2O)_n$ (where n is a natural number, and denotes accompaniment by a plurality of $H_2O$ molecules).

Figure 16A:
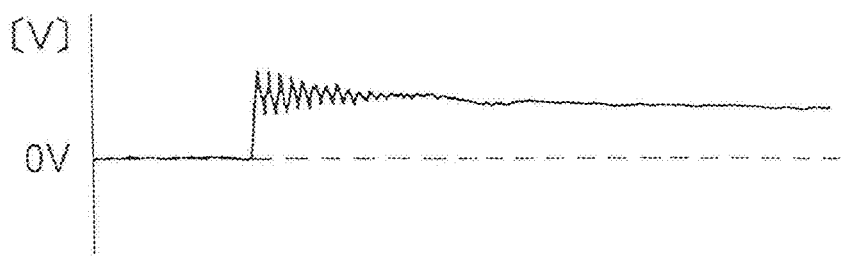
FIGS. 16A and 16B are waveform diagrams showing other operation voltage waveforms of the voltage application circuit shown in FIGS. 12 and 13.
Figure 16B:
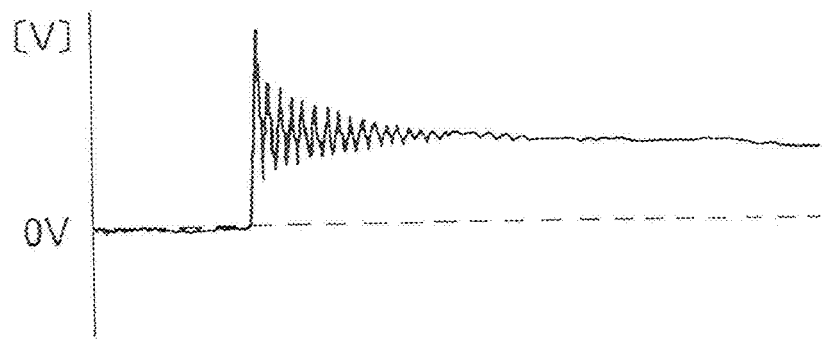

On the other hand, when the relay 214 is on, the secondary coil 202b is connected through the diode 209, which points in the reverse direction, to the line AC2. Thus, the voltage waveform at the first discharge electrode 12a and the voltage waveform at the first induction electrode 12b relative to the line AC2 are as shown in FIGS. 16A and 16B, respectively, i.e., positively biased versions of the waveform shown in FIG. 14A. Accordingly, substantially the same quantity of positive ions as the negative ions generated at the second discharger 13 are generated from the first discharger 12. The positive ions are $H^+(H_2O)_m$ (where m is a natural number, and denotes accompaniment by a plurality of $H_2O$ molecules).

Figure 14A:
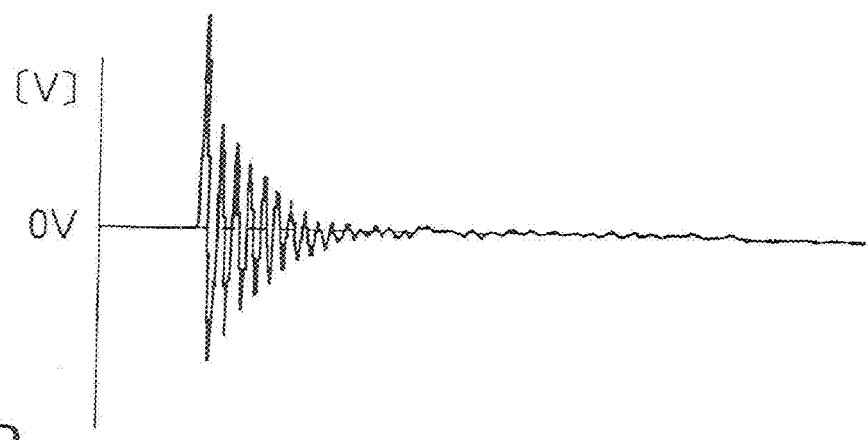
FIGS. 14A and 14B are waveform diagrams showing operation voltage waveforms of the voltage application circuit shown in FIGS. 12 and 13.
Figure 14B:
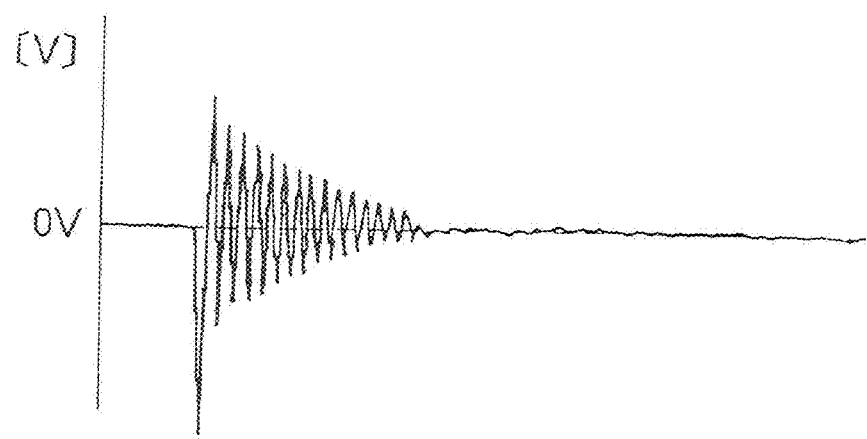
Figure 15A:
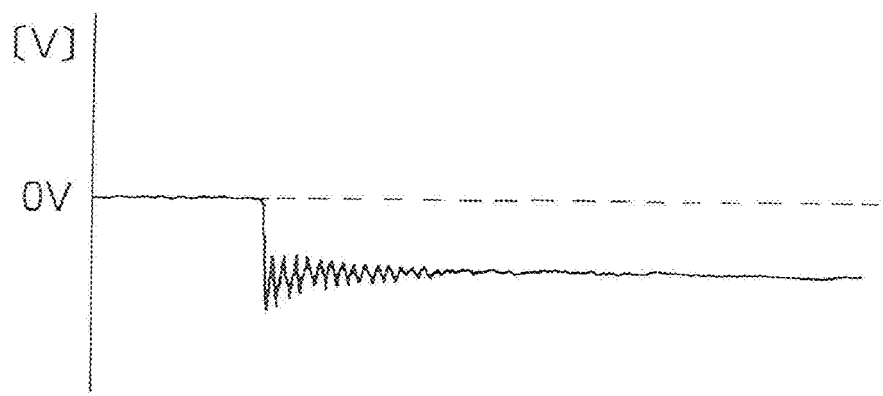
FIGS. 15A and 15B are waveform diagrams showing other operation voltage waveforms of the voltage application circuit shown in FIGS. 12 and 13.
Figure 15B:
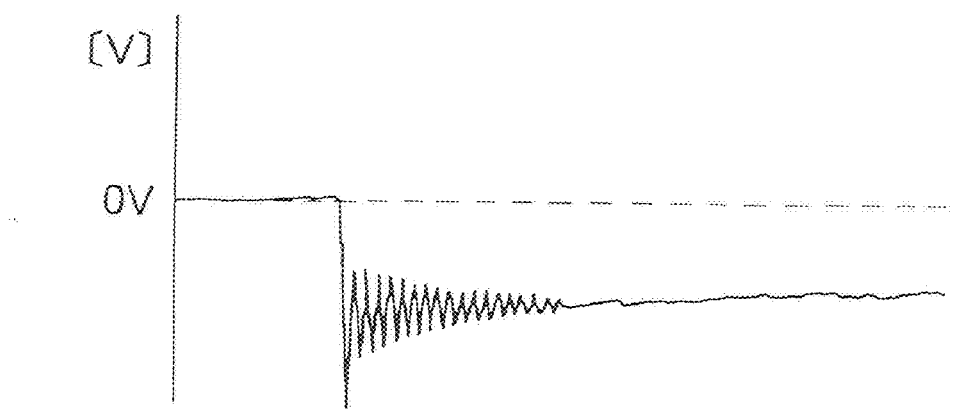
Figure 17A:
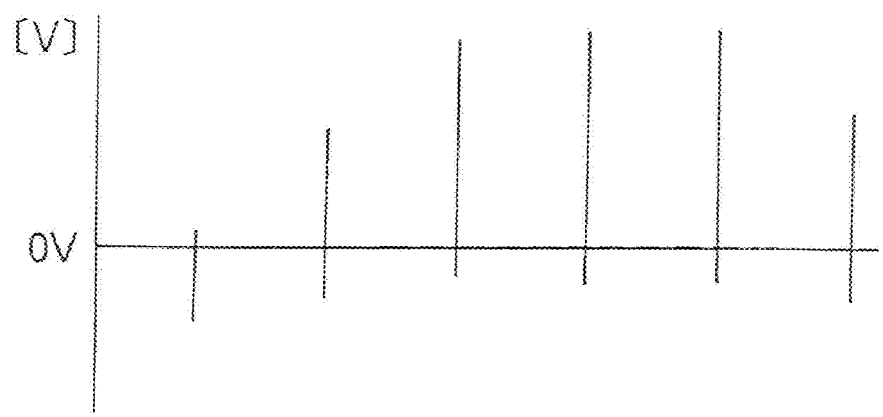
FIGS. 17A and 17B are waveform diagrams showing other operation voltage waveforms of the voltage application circuit shown in FIGS. 12 and 13.
Figure 17B:
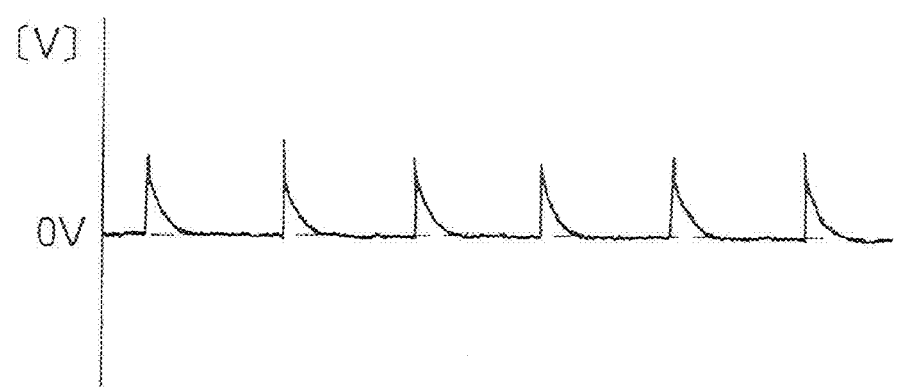

FIG. 17A is a diagram showing the waveform shown in FIG. 14A or 14B along a different time axis, and FIG. 17B is a diagram showing the waveform shown in FIG. 16A or 16B along a different time axis. The voltage applied to each electrode has an impulse waveform that decays in a short time as shown in these figures. This results from the electric oscillation damping by the inductance and resistance of the transformer and the action of the flywheel diode 213. Specifically, the current that is produced by the voltage induced in the primary coil 202a by the currents flowing through the secondary coils 202b and 202c is made to flow back through the primary coil 202a, the flywheel diode 213, and the transformer drive switching device 212, and this quickly damps the voltage oscillation that occurs in the secondary coil 202b and the secondary coil 202c.

Figure 18A:
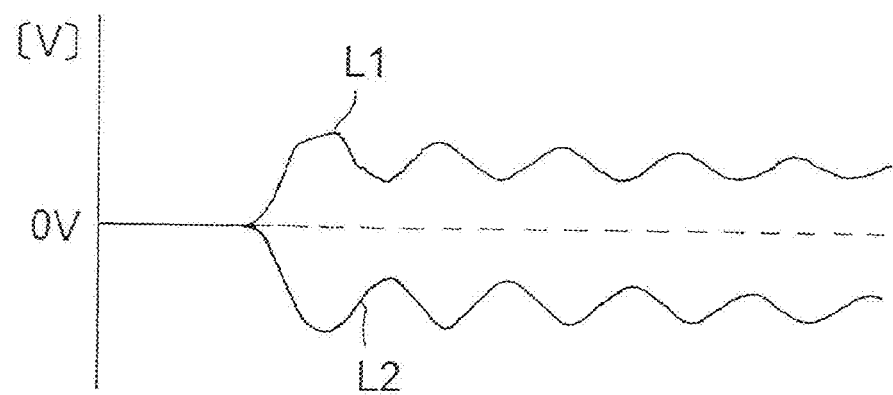
FIGS. 18A and 18B are waveform diagrams showing other operation voltage waveforms of the voltage application circuit shown in FIGS. 12 and 13.
Figure 18B:
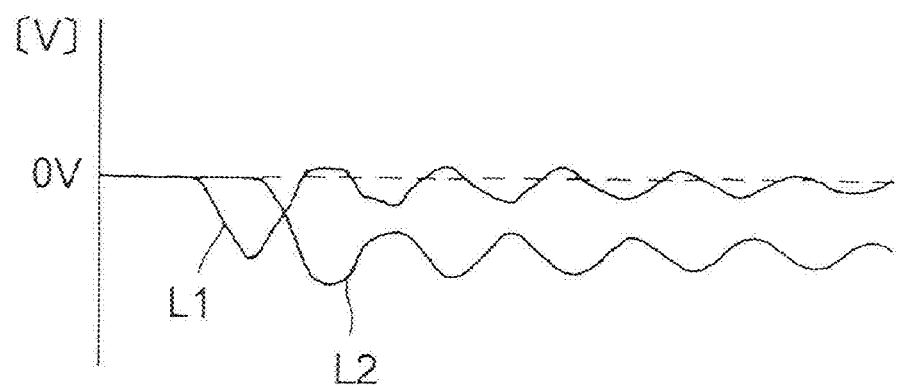

FIG. 18A is a waveform diagram showing the voltage waveforms at the first and second discharge electrodes 12a and 13a relative to the line AC2 when the relay 214 is on, and are thus the same as FIGS. 15A and 16A. FIG. 18B is a waveform diagram showing the voltage waveforms at the first and second discharge electrodes 12a and 13a relative to the line AC2 when the relay 214 is off. When the relay 214 is on, as shown in FIG. 18A, the voltage waveform at the first discharge electrode 12a indicated by line L1 is positively biased, and the voltage waveform at the second discharge electrode 13a indicated by line L2 is negatively biased. When the relay 214 is off, as shown in FIG. 18B, while the voltage waveform at the second discharge electrode 13a indicated by line L2 is negatively biased as otherwise, the voltage waveform at the first discharge electrode 12a indicated by line L1 is no longer biased but is now alternating. This is because, when the relay 214 is off, the secondary coil 202b is in a floating state. As a result of the first wave being negative and the second and following waves having an alternating waveform, both positive and negative ions are generated, though in small quantities.

Accordingly, when the relay 214 is off, the small quantities of positive and negative ions generated from the first discharger 12 combined with the large quantity of negative ions generated from the second discharger 13 produce, as a while, a state rich in negative ions in which a very small quantity of positive ions and a large quantity of negative ions are present. On the other hand, when the relay 214 is on, the positive ions generated from the first discharger 12 combined with the negative ions generated from the second discharger 13 produce a state in which substantially equal quantities of positive and negative ions are present.

Figure 13:
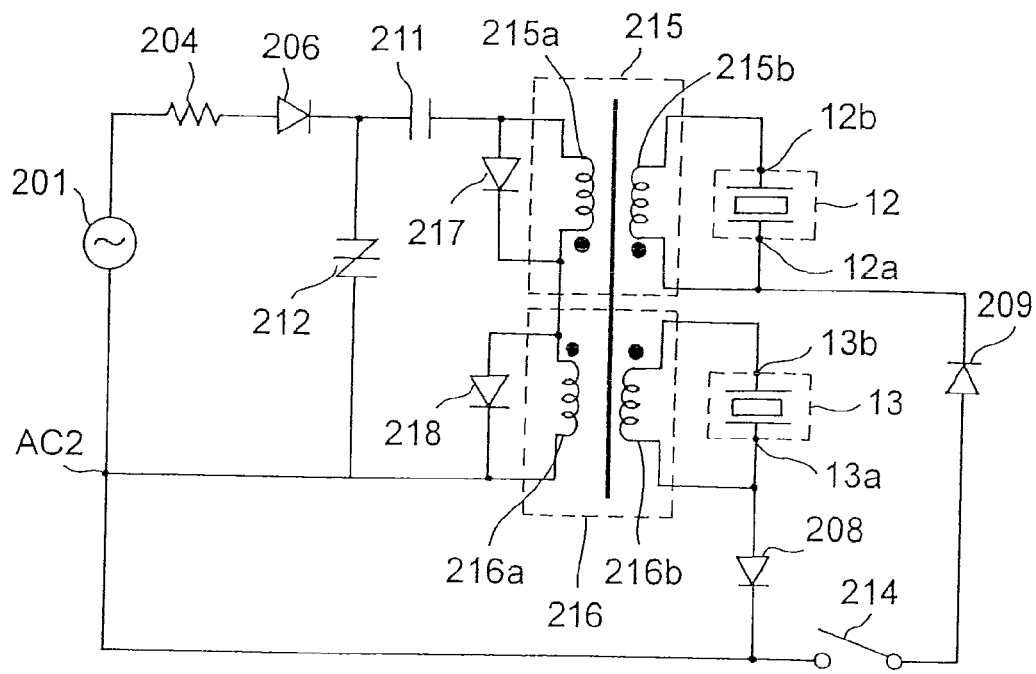
FIG. 13 is a circuit diagram showing still another embodiment of the voltage application circuit.
Figure 19:
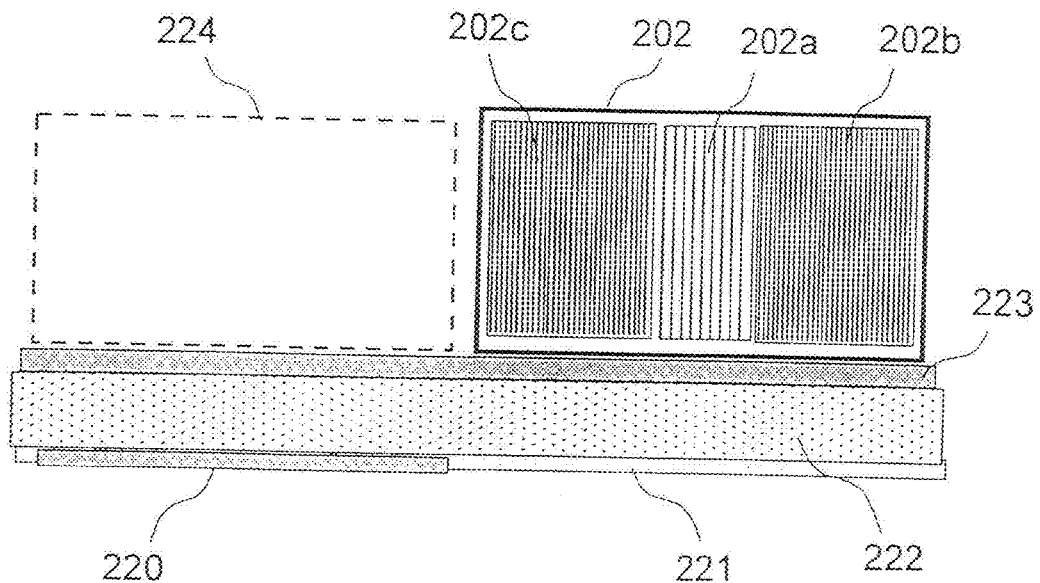
FIG. 19 is a diagram showing the arrangement of components in an ion generating apparatus incorporating the transformer shown in FIG. 12.
Figure 20:
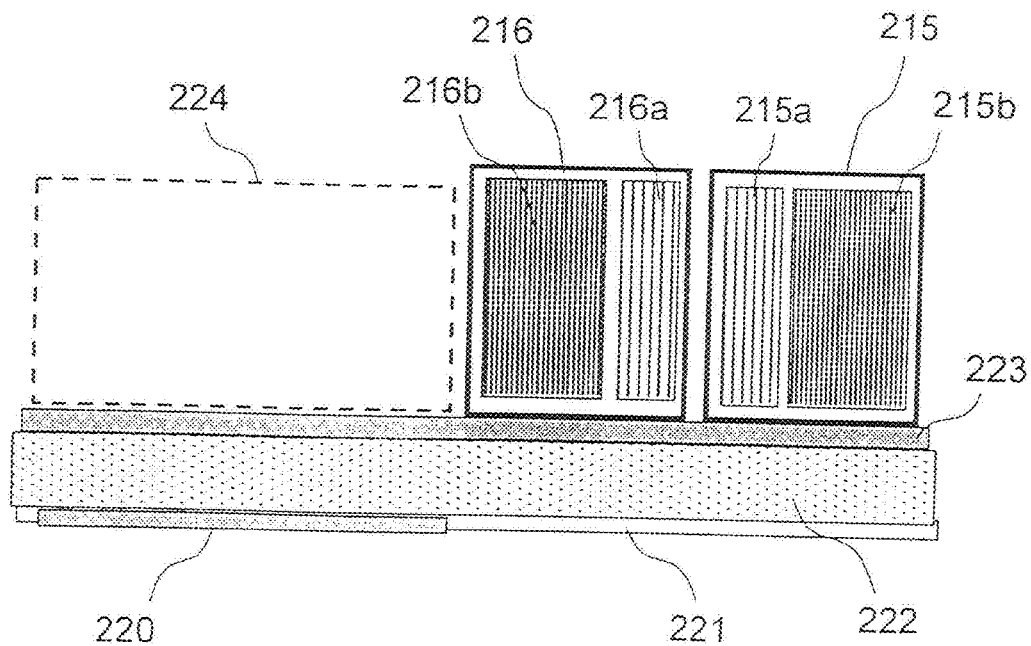
FIG. 20 is a diagram showing the arrangement of components in an ion generating apparatus incorporating the transformer shown in FIG. 13.

Thus, by releasing substantially equal quantities of $H^+(H_2O)_m$ and $O_2^-(H_2O)_n$ into the air, it is possible to surround airborne mold spores and viruses present in the air with those ions and thereby deactivate them by the action of a free radical, namely hydroxyl radical (.OH), produced as a result. Alternatively, it is possible to release a large quantity of negative ions into a space where an excessive quantity of positive ions are present due to electric appliances or for other causes in a household to restore a state in which well-balanced quantities of positive and negative ions are present as in a wild forest, or to obtain a relaxing effect. These modes of operation can be switched by turning the relay 214 on and off.

The transformer 202 shown in FIG. 12 has its coils arranged as shown in FIG. 19. FIG. 19 is a diagram showing the arrangement of components in the ion generating apparatus incorporating the transformer 202 shown in FIG. 12. In FIG. 19, reference numeral 220 represents an electrode panel portion where discharge electrodes (not illustrated) are formed, reference numeral 221 represents an electrode frame for keeping the electrode panel portion 220 in a fixed position, reference numeral 222 represents a molding material, reference numeral 223 represents a circuit board to which the transformer 202 is fixed and on which circuit components are mounted, and reference numeral 224 represents a circuit component mounting portion on which input/output connectors and other circuit components are mounted.

The transformer 202 has the secondary coils 202*b* and 202*c* arranged on both sides of the primary coil 202*a*. Arranging the coils of the transformer 202 in this way helps secure a distance between the secondary coils 202*b* and 202*c*, and thus helps alleviate the direct influence of the magnetic field generated by one secondary coil on the other. Thus, it is possible to alleviate the variation of the voltages appearing in the two secondary coils as a result of their respective magnetic fields affecting each other, and thus it is possible to prevent the variation of the quantities of ions generated by the ion generating element to which the voltages appearing in those secondary coils are applied.

FIG. 13 is a circuit diagram showing still another embodiment of the voltage application circuit 20. To simplify the description, such components as are found also in the embodiment shown in FIG. 12 are identified with the same reference numerals, and their explanations will not be repeated. The voltage application circuit 20 shown in FIG. 13 differs from the voltage application circuit 20 shown in FIG. 12 in that, instead of the combination of one transformer 202 and a flywheel diode 213, a combination of two transformers 215 and 216 and two flywheel diodes 217 and 218 connected respectively to the primary coils thereof is used. In addition, in the primary-side drive circuit, the arrangement of the transformer drive switching device 212 and the capacitor 211 is reversed.

In a case where the input power source 201 is commercially distributed alternating-current power, the voltage of the input power source 201 charges the capacitor 211 through the input resistor 204, the rectifying diode 206, and the flywheel diodes 217 and 218. When the voltage here becomes higher than a prescribed voltage, the transformer drive switching device 212 turns on and applies the voltage to the serial circuit consisting of a primary coil 215*a* of the transformer 215 and a primary coil 216*a* of the transformer 216. Immediately thereafter, the energy accumulated in the capacitor 211 is discharged through the transformer drive switching device 212 and the serial circuit consisting of the primary coil 215*a* of the transformer 215 and the primary coil 216*a* of the transformer 216. This turns the voltage across the capacitor 211 back to zero, and then charging starts again. In this way, charging and discharging are repeated at prescribed time intervals.

The transformers 215 and 216 have, as a secondary-side circuit, secondary coils 215*b* and 216*b*, respectively, and these are connected respectively to the first discharge electrode 12*a*, the first induction electrode 12*b*, the second discharge electrode 13*a*, and the second induction electrode 13*b* shown in one of FIGS. 2A, 2B, 3, 4A, 4B, and 8 to 11. When the transformer drive switching device 212 in the primary-side circuit turns on, the energy on the primary side is transmitted to the secondary coils 215*b* and 216*b*, causing an impulse-shaped voltage to appear therein. It should be noted that, here, the secondary coils and the electrodes are so connected that the polarity of the voltage applied between the first discharge electrode 12*a* and the first induction electrode 12*b* is opposite to the polarity of the voltage applied between the second discharge electrode 13*a* and the second induction electrode 13*b*.

To the first discharge electrode 12*a* is connected not only the secondary coil 215*b* of the transformer 215 but also the cathode of a diode 209. The anode of the diode 209 is, through a relay 214, grounded or connected to one side (a line AC2) of the input power source 201. To the second discharge electrode 13*a* is connected not only the secondary coil 216*b* of the transformer 216 but also the anode of a diode 208. The cathode of the diode 208 is grounded or connected to one side (the line AC2) of the input power source 201.

The operation voltage waveforms of the voltage application circuit 20 configured in this way as shown in FIG. 13 are the same as the operation voltage waveforms (FIGS. 14A to 17A and FIGS. 14B to 17B) of the voltage application circuit 20 shown in FIG. 12, and therefore their explanations will not be repeated. The voltage application circuit 20 shown in FIG. 13 is characterized in that the transformer 215 for applying a voltage between the first discharge electrode 12*a* and the first induction electrode 12*b* and the transformer 216 for applying a voltage between the second discharge electrode 13*a* and the second induction electrode 13*b* are independent of each other, and in that, for those transformers, the flywheel diodes 217 and 218 are provided respectively.

In this configuration, the current produced by the voltage induced in the primary coil 215*a* by the current flowing through the secondary coil 215*b* simply flows back through the primary coil 215*a* and the flywheel diode 217, and thus does not influence the transformer 216. Likewise, the current produced by the voltage induced in the primary coil 216*a* by the current flowing through the secondary coil 216*b* simply flows back through the primary coil 216*a* and the flywheel diode 218, and thus does not influence the transformer 215. Thus, even when a load variation or the like occurs in one discharger, the variation does not influence the voltage applied to the other discharger. Thus, it is possible to prevent variation of the quantity of ions generated by the other discharger.

In the voltage application circuit 20 shown in FIG. 13, the primary coil 215*a* of the transformer 215 and the primary coil 216*a* of the transformer 216 are connected in series. It is, however, also possible to adopt a circuit configuration in which they are connected in parallel.

The transformers 215 and 216 shown in FIG. 13 have their coils arranged as shown in FIG. 20. FIG. 20 is a diagram showing the arrangement of components in the ion generating apparatus incorporating the transformers 215 and 216 shown in FIG. 13. For convenience's sake, such components as are found also in FIG. 19 are identified with the same reference numerals. In FIG. 20, reference numeral 220 represents an electrode panel portion where discharge electrodes (not illustrated) are formed, reference numeral 221 represents an electrode frame for keeping the electrode panel portion 220 in a fixed position, reference numeral 222 represents a molding material, reference numeral 223 represents a circuit board to which the transformers 215 and 216 are fixed and on which circuit components are mounted, and reference numeral 224 represents a circuit component mounting portion on which input/output connectors and other circuit components are mounted.

The transformers 215 and 216 have the secondary coil 216b, the primary coil 216a, the primary coil 215a, and the secondary coil 215b arranged in this order. Arranging the transformers 215 and 216 in this way helps secure a distance between the secondary coils 216b and 215b, and thus helps alleviate the direct influence of the magnetic field generated by one secondary coil on the other. Thus, it is possible to alleviate the variation of the voltages appearing in the two secondary coils as a result of their respective magnetic fields affecting each other, and thus it is possible to prevent the variation of the quantities of ions generated by the ion generating element to which the voltages appearing in those secondary coils are applied.

In the above description, the transformer drive switching device 212 shown in FIGS. 12 and 13 is assumed to be a no-gate, two-terminal thyristor (a "Sidac" manufactured by Shindengen Electric Manufacturing Co., Ltd., Japan). It is, however, also possible to adopt a slightly different circuit configuration using a thyristor (SCR). The input power source 201 may be a direct-current power source so long as the circuit is so configured as to operate in a similar way as described above. That is, the primary-side drive circuit of the circuit may be configured in any manner so long as it operates in a similar way.

Ion generating elements or ion generating apparatuses according to the invention as described above can be incorporated in electric appliances such as air conditioners, dehumidifiers, humidifiers, air purifiers, refrigerators, fan heaters, microwave ovens, washer-driers, cleaners, and sterilizers. With such electric appliances, it is possible to achieve, in addition to the functions of the electric appliances themselves, the function of varying the quantity and balance of ions in the air by operating the incorporated ion generating apparatus and thereby produce a desired environment in a room.

All the embodiments described above deal with cases in which a single ion generating element having a plurality of ion-generating discharger is used to generate positive and negative ions separately and to release the two types of ions independently into a room. It should be understood, however, that the present intention may be implemented in any other manner; for example, it is possible to adopt a construction in which a plurality of ion generating elements are used to generate positive and negative ions separately and to release the two types of ions independently into a room.

INDUSTRIAL APPLICABILITY

Ion generating elements and ion generating apparatuses according to the present invention can be used in various electric appliances such as air conditioners, dehumidifiers, humidifiers, air purifiers, refrigerators, fan heaters, microwave ovens, washer-driers, cleaners, and sterilizers that are used chiefly in a closed space (i.e., in a house, in a room in a building, in a sickroom or operating room in a hospital, in a car, in an aircraft, in a ship, in a storehouse, or in a compartment in a refrigerator).

The invention claimed is:

1. An ion generating element, comprising:
    a positive ion discharger for generating positive ions; and
    a negative ion discharger for generating negative ions, the ion dischargers arranged separately from and independently of each other with a distance securing insulation therebetween,
    wherein at least one of the dischargers includes
        a discharging portion for causing electric discharge, and
        a conducting portion having a voltage same as the discharging portion, surrounding a perimeter or part of the discharging portion, and interposed between the positive ion discharger and the negative ion discharger so as to separate the ion dischargers in space, one from the other.

2. The ion generating element according to claim 1, wherein
    at last one of the positive and negative ion dischargers has a pair of a discharge electrode and an induction electrode arranged with a dielectric member in between the electrodes.

3. The ion generating element according to claim 1, wherein
    the positive ions generated by the positive ion discharger are $H^+(H_2O)_m$ and the negative ions generated by the negative ion discharger are $O_2^-(H_2O)_n$.

4. An ion generating apparatus, comprising:
    the ion generating element according to claim 1;
    a voltage application circuit; and
    a blower for releasing the ions generated by the ion dischargers.

5. The ion generating apparatus according to claim 4, wherein
    the voltage application circuit generates positive ions by applying, to the positive ion discharger, a voltage waveform obtained by positively biasing an alternating-current impulse voltage, and generates negative ions by applying, to the negative ion discharger, a voltage waveform obtained by negatively biasing the alternating-current impulse voltage.

6. The ion generating apparatus according to claim 5, wherein the voltage application circuit includes:
    a voltage application portion and a switching portion together switchable between a mode in which the positive ions are generated by applying, to the ion dischargers, the voltage waveform obtained by positively biasing the alternating-current impulse voltage and a mode in which the negative ions are generated by applying, to the ion dischargers, the voltage waveform obtained by negatively biasing the alternating-current impulse voltage,
    wherein operation is switchable between a mode in which approximately equal quantities of the positive and negative ions are generated and a mode in which only the negative ions are generated.

7. An ion generating element, comprising:
    a positive ion discharger for generating positive ions; and
    a negative ion discharger for generating negative ions, the ion dischargers arranged separately from and independently of each other with a distance securing insulation therebetween,
    wherein at least one of the ion dischargers includes
        a discharging portion for causing electric discharge, and a conducting portion having a voltage same as the discharging portion, the conducting portion surrounding at least a portion of the discharging portion, and configured to repel ions generated by the at least one of the dischargers in a direction away from the other of the ion dischargers.

8. The ion generating element according to claim 7, wherein
the discharging portion and the conducting portion have a substantially planar shape.

* * * * *